(12) United States Patent
Yoshimoto et al.

(10) Patent No.: US 6,386,088 B1
(45) Date of Patent: May 14, 2002

(54) HYDRAULIC CYLINDER

(75) Inventors: Mitsuhiro Yoshimoto, Ibaraki-ken; Tomohiko Yasuoka, Toride; Akinori Ro, Ibaraki-ken, all of (JP)

(73) Assignee: Hitachi Construction Machinery, Co. Ltd., Tokyo (JP)

( * ) Notice: Subject to any disclaimer, the term of this patent is extended or adjusted under 35 U.S.C. 154(b) by 0 days.

(21) Appl. No.: 09/463,437

(22) PCT Filed: May 27, 1999

(86) PCT No.: PCT/JP99/02788

§ 371 Date: Jan. 27, 2000

§ 102(e) Date: Jan. 27, 2000

(87) PCT Pub. No.: WO99/63233

PCT Pub. Date: Dec. 9, 1999

(30) Foreign Application Priority Data

May 29, 1998 (JP) .......................................... 10-149467
May 29, 1998 (JP) .......................................... 10-150050

(51) Int. Cl.[7] ................................................ F15B 15/22
(52) U.S. Cl. ........................... 91/395; 91/396; 91/405
(58) Field of Search ........................ 91/394, 395, 396, 91/397, 405; 92/255, 85 R, 85 B

(56) References Cited

U.S. PATENT DOCUMENTS

| | | | | |
|---|---|---|---|---|
| 1,538,132 A | * | 5/1925 | Minnier ........................ | 92/255 |
| 3,704,650 A | * | 12/1972 | Berg ............................. | 91/396 |
| 3,759,146 A | * | 9/1973 | Brotherton .................... | 92/255 |
| 4,409,886 A | * | 10/1983 | Herner ........................ | 91/397 |
| 4,424,737 A | * | 1/1984 | Endo ............................. | 91/396 |
| 5,680,913 A | * | 10/1997 | Wood ............................. | 91/405 |

FOREIGN PATENT DOCUMENTS

| | | | | |
|---|---|---|---|---|
| AU | 266730 | * | 4/1963 | .................. 91/394 |
| JP | 49-25944 | | 6/1972 | |
| JP | 55-22595 | | 8/1978 | |
| JP | 57-121403 | | 1/1981 | |
| JP | 57-203103 | | 12/1982 | |
| JP | 59-93538 | | 5/1984 | |
| JP | 60-95210 | | 6/1985 | |
| JP | 6-62207 | | 9/1994 | |
| JP | 7-16888 | | 4/1995 | |
| JP | 9-49507 | | 2/1997 | |

* cited by examiner

Primary Examiner—F. Daniel Lopez
Assistant Examiner—Igor Kershteyn
(74) Attorney, Agent, or Firm—Mattingly, Stanger & Malur

(57) ABSTRACT

A hydraulic cylinder in which a recess (21) is formed in a piston rod (3) side end surface (20) of a piston (4) so that the recess (21) serves as an axial fitting portion, and an end of the piston rod (3) is fitted into the recess (21) of the piston (4) to ensure the coaxial relationship between the piston rod (3) and the piston (4). Axial threaded holes (24) are formed in an end surface (23) of the piston rod (3) and axial bolt through-holes (25) are formed in the piston (4). The end surface (20) of the piston (4) is disposed in face-to-face contact with the end surface (23) of the piston rod (3), and under the condition bolts (22) are inserted through the bolt through-holes (25) and screwed into the threaded holes (24) to fix the piston (4) to the piston rod (3). Accordingly, the strength of a piston connecting portion can be improved with a simple structure without use of any special high-strength material for the piston rod and without any special heat treatment.

17 Claims, 29 Drawing Sheets

CONVENTIONAL STRUCTURE 1

CONVENTIONAL STRUCTURE 2

HYDRAULIC CYLINDER

TECHNICAL FIELD

The present invention relates to a hydraulic cylinder used in hydraulic working machine such as a hydraulic construction machine, or the like, and in particular to a hydraulic cylinder in which a piston connecting structure is improved and a structure for mounting a bottom side cushioning device is simplified.

BACKGROUND ART

In a hydraulic working machine such as a hydraulic excavator which is a representative of the hydraulic construction machine, or the like, a hydraulic cylinder is used as an actuator for driving an operating member. As shown in FIG. 27, the hydraulic cylinder comprises a cylinder body 102, a piston rod 103 moving in the cylinder body 102, and a piston 104 provided at an end of the piston rod 103 and divide the inside of the cylinder body 102 into a rod-side chamber 107a and a bottom-side chamber 107b.

Such a hydraulic cylinder generally has a piston connecting structure described in JP-Y-7-16888, JP-U-6-62207, etc., for example. That is, a piston insertion portion 103f is provided at an end portion of the piston rod 103 through a stepped portion 103e, and a male screw portion 103g is formed at an end portion of the piston insertion portion 103f. The piston 104 is inserted onto the piston insertion portion 103f, and a nut 112 is fastened to the male screw portion 103g to force the piston 104 to abut against the stepped portion 103e. As a result, the piston 104 is fixed and connected to the piston rod 103.

Another piston connecting structure shown in FIG. 28 has been proposed. This example is one described in JP-U57-203103. An annular groove 103k is further provided in a small-diameter piston insertion portion 103j, and the piston 104 is fitted until abutting against a stepped portion 103m, and under the condition, half-ring shaped flanges 160 formed by radially dividing a circular ring into two sections are fitted into the annular groove 103k, and therefore the flanges 160 are fastened to the piston 104 by bolts 170. As a result, the piston 104 is fixed and connected to the piston rod 103. The inside of the cylinder body 102 is divided by the piston 104 into the chambers 107a and 107b, and an O-ring 180 is provided between the piston insertion portion 103j and the piston 104 in order to seal the chambers 107a and 107b from each other.

On the other hand, as a cushioning device for reducing a shock at a stroke end of the piston rod, there is known such a device using a floating type cushion ring as described in JP-Y-7-16888 and JP-U-6-62207. That is, JP-Y7-1-6888 discloses a cushioning device using a floating type cushion ring as each of the rod side and bottom side cushioning devices and JP-U-6-62207 discloses a cushioning device using a floating type cushion ring used as a bottom side cushioning device.

FIG. 27 shows an example in JP-Y-7-16888. In FIG. 27, a rod-side ring insertion portion 103a is provided between the piston rod 103 and the piston insertion portion 103f, and a bottom-side ring insertion portion 103h is provided further in an end of the male screw portion 103g of the piston rod 103, and the piston rod 103, the rod-side ring insertion portion 103a, the piston insertion portion 103f and the bottom-side ring insertion portion 103h are reduced in diameter in this order. A rod-side cushion ring 130 is loosely fitted on the rod-side ring insertion portion 103a so as to be movable axially and radially, and a bottom-side cushion ring 140 is loosely fitted on the bottom-side ring insertion portion 103h so as to be movable axially and radially. A cushion stopper 150 such as a plug is attached in a threaded hole 103i formed in an end surface of the ring insertion portion 103h to retain the cushion ring 140.

When a hydraulic fluid is supplied to the rod-side chamber 107a, the piston rod 103 is moved to the right in the figure to retract the hydraulic cylinder. At this time, in the vicinity of the stroke end, the bottom-side cushion ring 140 enters a cushion hole 105c formed in an inlet portion of a supply and discharge port 109 in a bottom-side cylinder head, and a corresponding portion of the cushion hole 105c is occupied by the cushion ring 140 so that a hydraulic fluid passage is restricted. As a result, a cushioning pressure is established in the chamber 107b to reduce a stroke speed thereby to reduce the shock at the stroke end. At this time, since the cushion ring 140 is movable axially and radially, the cushion ring 140 enters the cushion hole 105c following the shape of an the inner circumference of the cushion hole 105c (centering function). Accordingly, there is no fear of biting between the cushion ring 140 and a wall portion of the cushion hole. Further, the cushioning pressure is established in the bottom-side chamber 107b when the cushion ring 140 enters the cushion hole 105c, and a pressure difference is generated between the cushion hole side of the cushion ring 140 and the chamber 107b side thereof to urge the cushion ring 140 against the cushion stopper 150 so as to be brought into tight contact with the cushion stopper 150. Accordingly, there is no fear of flowing of a hydraulic fluid from the bottom-side chamber 107b into the supply and discharge port 109 via a gap between the outer circumferential surface of the ring insertion portion 103h and the inner circumferential surface of the cushion ring 140 (undirectional flow function.

When a hydraulic fluid is supplied to the hydraulic cylinder through the port 109 after the hydraulic cylinder reaches the stroke end, the piston rod 103 begins to move to the left in the figure in an extending direction and the cushion ring 140 is withdrawn from the cushion hole 105c. At this time, the hydraulic fluid supplied to the hydraulic cylinder through the supply and discharge port 109 flows into the chamber 107b via the gap between the outer circumferential surface of the cushion ring 140 and the inner circumferential surface of the cushion hole 105c. Further, the cushion ring 140 is pressed against an end surface of the piston insertion portion 104f by the hydraulic fluid given through the port 109. At this time, however, since grooves 140a are provided at an end portion of the cushion ring 140 at the side of the piston insertion portion 103f, and therefore the hydraulic fluid flows into a gap between the outer circumferential surface of the ring insertion portion 103h and the inner circumferential surface of the cushion ring 140 and further flows into the chamber 107b through the grooves 140a (unidirectional flow function). Thus, the cushion ring 140 is satisfactorily withdrawn from the cushion hole 105c.

Although the bottom-side cushion ring 140 has been described above, the rod-side cushion ring 130 functions in the same manner as in the bottom-side cushion ring 140. That is, the rod-side cushion ring 130 is also movable axially and radially, and grooves 130a are provided in the piston-side end portion of the cushion ring 130, while the end portion of the cushion ring 130 on the opposite side can be brought into tight contact with a stepped portion 103b which is a boundary between the piston rod 103 and the ring insertion portion 103a. When the hydraulic cylinder extends and enters the cushion hole upstream of the supply and discharge port in the vicinity of the stroke, the stroke speed is reduced so that the shock at the stroke end is reduced while the cushion ring fulfills the centering function and the unidirectional flow function with respect to the cushion hole. When the hydraulic cylinder contracts from the stroke end position, the cushion ring is satisfactorily withdrawn from the cushion hole by the unidirectional flow function.

Further, a bottom-side cushioning device using a cushion plunger instead of the cushion ring is known, and an example thereof is described in JP-U-1-166105. In the plunger type cushioning device, a base portion of a conically shaped cushion plunger (cushioning rod) is retained in an engaging hole formed to in an end surface of the piston rod, and balls are inserted in a groove provided in the outer circumference of the base portion and in a groove provided in the inner surface of the engagement hole through a lateral threaded hole formed to open radially from an outer circumferential portion of an end portion of the piston rod, and further a screw is inserted in the lateral threaded hole to hold the balls. As a result, the cushion plunger is loosely fitted in the engaging hole thereby to fulfill a centering function when the speed is reduced at the stroke end.

DISCLOSURE OF THE INVENTION

In the hydraulic cylinder shown in FIG. 27, as described above, when a hydraulic fluid is supplied to the bottom-side chamber 107b, the piston rod 103 is moved to the left in the figure so that the hydraulic cylinder extends, and when a hydraulic fluid is supplied to the rod-side chamber 107a, the piston rod 103 is moved to the right in the figure so that the hydraulic cylinder contracts. In the hydraulic working machine such as a hydraulic excavator, or the like, the hydraulic cylinder frequently extends/contracts in such a manner, and whenever the hydraulic cylinder extends/contracts, the pressure of the chamber 107a or 107b acts on the piston 104.

Incidentally, in the conventional piston connecting structure shown in FIG. 27, the piston 104 is connected by fastening the nut 112 to the male screw portion 103g provided in the piston insertion portion 103f, and therefore when the pressure of the chamber 107a or 107b acts on the piston 104, the pressure of the chamber 107a or 107b is applied to a section of the male screw portion 103g of the piston insertion portion 103f, and thus the piston rod 103 is apt to be broken at the male screw portion 103g.

FIG. 29 shows a relationship between the maximum principal stress acting on the male screw portion 103g of the piston insertion portion 103f and the number of threads of the male screw portion 103g. The number of threads is counted from a loading point by the fastened nut 112, that is, contacting surfaces of the piston 104 and the nut 112. As will be seen from FIG. 2, the maximum tensile stress is applied to the first thread portion of the male screw portion 103g and the tensile stress changes repeatedly upon pressurizing the rod-side chamber 107a or the bottom-side chamber 7b. Accordingly, the male screw portion 103g is broken at the first thread portion. It is, therefore, necessary to form the piston rod 103 from a high-strength material or apply a heat treatment to the male screw portion 103g in order to improve the strength of the first thread portion of the male screw portion 103g.

Further, in the conventional piston connecting structure shown in FIG. 28, the pressure applied to the piston 104 is received by a section of the annular groove 103k of the piston insertion portion 103j. Accordingly, the piston rod 103 is apt to be broken at the annular groove 103k, and therefore it is necessary to improve the strength of the piston rod 103 in the same manner as in the piston connecting structure shown in FIG. 27. Further, in this structure, two half-ring shaped flanges 160 are required, and an O-ring 180 is further required between the piston insertion portion 103j and the piston 104 to seal the two chambers 107a and 107b separated by the piston 104 from each other, and therefore a problem arises that the number of parts increases.

Further, in the hydraulic cylinder with the cushioning devices, it is necessary to apply a special processing to the end of the piston rod as described above in order to mount the bottom-side cushioning device.

That is, in the floating type bottom-side cushioning device, it is necessary to apply processing to form the ring insertion portion 103h, threaded hole 103i, etc. to the end of the long piston rod as shown in FIG. 27 to retain the cushion ring 140 by an engaging element such as the cushion stopper 150, or the like. Also in the bottom-side cushioning device using a cushion plunger described in JP-U1-166105, it is necessary to apply fine processing to form the engaging hole, lateral threaded hole, etc. to the end portion of the long piston rod, similarly.

In either case, therefore, it is necessary to apply a complex processing to the end of the piston rod, so. that a productivity becomes poor. Further, when a failure occurs in the ring insertion portion 103h, or the threaded hole 103i for the cushion stopper 150, or in the cushion plunger engaging hole or the lateral threaded hole, the expensive piston rod itself must be exchanged to a new one, and therefore a serviceability is low.

Further, in the bottom-side cushioning device using such a cushion plunger as described in JP-U-1-166105, there is no unidirectional flow function, so that the withdrawing performance is poor.

A first object of the present invention is to provide a hydraulic cylinder having a piston connecting structure in which the strength of a piston connecting portion can be improved with a simple structure without use of any special high-strength material for a piston rod and application of any heat treatment thereto.

A second object of the present invention is to provide a hydraulic cylinder in which the strength of a piston connecting portion can be improved with a simple structure without use of any special high-strength material for a piston rod and application of any heat treatment thereto and in which a bottom-side cushioning device is provided and the piston rod can be processed easily.

A third object of the present invention is to provide a hydraulic cylinder in which the strength of a piston connecting portion can be improved with a simple structure without use of any special high-strength material for a piston rod and application of any heat treatment thereto and in which a cushion plunger is used as a bottom-side cushioning device which is provided with a centering function and a unidirectional flow function.

(1) In order to achieve the above-mentioned first object, according to the present invention, there is provided a hydraulic cylinder comprising a piston rod, a piston connected to an end of the piston rod, and a cylinder body having therein a rod-side chamber and a bottom-side chamber divided by the piston, wherein the piston is fixed directly to the piston rod by a bolt inserted through a bolt hole formed in the piston and screwed into a threaded hole provided in the piston rod while a rod-side end surface of the piston is disposed at least partially in a face-to-face contact with an end surface of the piston rod.

By fixing the piston directly to the piston rod by bolts in such a manner, a force applied to the piston is received by the bolt upon operation of the hydraulic cylinder, and therefore, though a tensile stress acts on the bolt, a sufficient strength is obtained even if the bolt is formed of a usual material. Further, since the screw portion of the threaded hole in the piston rod is a female screw, there is no problem in strength even if the piston rod is formed of a usual piston rod material. Accordingly, it is unnecessary to use a high-strength material for the piston rod and to apply a heat treatment to improve the strength, and therefore the piston rod can be produced using an inexpensive material at low-cost. Further, since the piston is fixed by bolt directly, fatigue strength against external force is also improved, and therefore the strength of the piston connecting portion can be improved with a simple structure, so that the life of the piston rod can be improved.

Further, since the piston is fixed by the bolt directly, the number of parts can be minimized.

Further, since the conventional small-diameter piston insertion portion is not required, it is not necessary to provide a surplus stepped portion in the piston rod, and therefore the problem of damage in the piston rod at the stepped portion is reduced.

(2) In the above paragraph (1), preferably, a plurality of threaded holes and a plurality of bolt holes are formed and a plurality of bolts are used for fixing the piston to the piston rod.

By using a plurality of bolts in such a manner, torque for tightening each bolt can be reduced, and therefore it is easy to assemble and disassemble the piston connecting structure.

Further, since a torque for tightening each bolt is small, the bolts can be loosened manually without use of such a large-scale exclusive machine as required conventionally, and therefore a serviceability is improved.

(3) In the above paragraph (1), preferably, an axial fitting portion is formed in at least one of the end surface of the piston rod and the rod-side end surface of the piston thereby for ensuring a coaxial relationship between the piston and the piston rod.

(4) In the above paragraph (1), pins may be forced into the end surface of the piston rod and the rod-side end surface of the piston for ensuring the coaxial relationship between the piston and the piston rod.

(5) Further, in order to achieve the above-mentioned second object, according to the present invention, there is provided a hydraulic cylinder wherein in the above paragraph (1), a bottom-side cushioning device protruding from a bottom-side end surface of the piston is provided so as to a cushion hole connected to a bottom-side hydraulic fluid port of the cylinder body when the piston rod is moved to contract.

By providing the bottom-side cushioning device protruding from the bottom-side end surface of the piston in such a manner, a shock at the stroke end can be reduced when the piston rod is moved to contract, and further, it is unnecessary to apply a complex processing to the end of the piston rod to attach the bottom-side cushioning device, and therefore the piston rod is can be processed easily.

(6) In the above paragraph (5), preferably, the bottom-side cushioning device has a centering function to bring the bottom-side cushioning device into an axial alignment with the cushion hole when the bottom-side cushioning device enters the cushion hole.

With such a structure, the bottom-side cushioning device enters the cushion hole smoothly following the shape of the cushion hole, and therefore there is no fear of biting between the bottom-side cushioning device and the cushion hole.

(7) In the above paragraph (5), preferably, the bottom-side cushioning device has a centering function to bring the bottom-side cushioning device into an axial alignment with the cushion hole when the bottom-side cushioning device enters the cushion hole, and a unidirectional flow function to prevent a hydraulic fluid from flowing from the bottom-side chamber into the hydraulic fluid port when the bottom-side cushioning device enters the cushion hole while allowing a hydraulic fluid to flow from the hydraulic fluid port into the bottom-side chamber when the bottom-side cushioning device is withdrawn from the cushion hole.

With such a structure, the bottom-side cushioning device is provided with the unidirectional flow function in addition to the centering function, and therefore a satisfactory performance of withdrawing from the cushion hole is secured.

(8) Further, in the above paragraph (5), preferably, the bottom-side cushioning device includes a cushion plunger protruding from a bottom-side end surface of the piston so as to be able to enter the cushion hole when the piston rod is moved to contract.

By using the cushion plunger in such a manner, the problem in swelling of the cushion device due to the difference between pressure distributions in inner and outer circumferential surfaces as in the cushion ring is avoided, and therefore a stable cushioning performance can be always secured.

(9) In the above paragraph (8), preferably, the cushion plunger includes an enlarged base end portion located between the end surface of the piston rod and the rod-side end surface of the piston, and a shaft portion passing through the piston and protruding from the bottom-side end surface of the piston; the cushion plunger is retained with the enlarged base end portion while being allowed to radially move or tilt simultaneously when the piston is fixed to the piston rod by the bolt, the arrangement of the cushion plunger to allow the radial movement or tilting providing a centering function to bring the cushion plunger into an axial alignment with the cushion when the cushion plunger enters the cushion hole.

By retaining the cushion plunger with the enlarged base simultaneously when the piston is fixed to the piston rod by bolt in such a manner, the cushion plunger is attached and secured, and therefore the necessity of applying processing to the piston rod for attaching the cushion plunger is eliminated or minimized, and thus it is easy to process the piston rod. Further, since the piston serves also as an element for retaining the cushion plunger, the number of parts can be reduced.

Further, by attaching the cushion plunger so as to be able to radially move or tilt, the centering function is fulfilled when the cushion plunger enters the cushion hole.

(10) In the above paragraph (9), preferably, the enlarged base end portion of the cushion plunger is a flange portion provided at a base end of the cushion plunger; said piston is formed at its central portion with a through-hole through which the shaft portion of the cushion plunger passes and an counter-sunk hole receiving the flange portion, the flange portion being located in the counter-sunk hole between the end surface of the piston rod and a wall portion of the counter-sunk hole; the through-hole and counter-sunk hole are dimensioned in such a manner to provide gaps between the through-hole and the shaft portion of the cushion plunger and between the counter-sunk hole and the flange portion of the cushion plunger thereby to allow the cushion plunger to move radially.

With such a structure, as described above in the paragraph (9), the cushion plunger is attached simultaneously with the fixing of the piston to the piston rod by bolt, and the cushion plunger can move radially.

(11) In the above paragraph (10), preferably, resilient means is disposed between the flange portion at the base end of the cushion plunger and the end surface of the piston rod or the rod-side end surface of the piston thereby to resiliently restrict the axial movement of the cushion plunger.

With such a structure, even if the axis of the cushion plunger is displaced from the center of the cushion hole upon assembling, the position of the cushion plunger is held once a centering has been made, and therefore, the cushion plunger can enter the cushion hole without further centering any more.

(12) In the above paragraph (9), the enlarged base end portion of the cushion plunger is a spherical portion provided at a base end of the cushion plunger; the spherical portion is held between the end surface of the piston rod and the rod-side end surface of the piston so as to come into spherical contact therewith; the piston is formed at its central portion with a through-hole through which the shaft portion of the cushion plunger passes; the through-hole is dimensioned in such a manner to provide a gap between the through-hole and the shaft portion of the cushion plunger thereby to allow the cushion plunger to tilt.

With such a structure, as described above in the paragraph (9), the cushion plunger is attached simultaneously with the fixing of the piston to the piston rod by bolt to be able to tilt. Further, since the cushion plunger can tilt, the centering function is fulfilled to accommodate the angular displacement between the axis of the cushion plunger and the axis of the cushion hole, and further, a partial wearing is avoided because of the spherical contact.

(13) Further, in the above paragraph (8), the cushion plunger may be of a fixed type in which the cushion plunger is united with the piston as one body.

Also when the cushion plunger is of a fixed type in such a manner, it is unnecessary to provide the cushion plunger in the piston rod, and therefore, the piston rod can be processed easily. Further, since the cushion plunger is united with the piston as one body, the number of parts can be reduced.

(14) Further, in order to achieve the above-mentioned third object, according to the present invention, there is provided a hydraulic cylinder wherein in the above paragraph (9), the cushion plunger includes a first passage formed to open at an end of the shaft portion and extend axially in the shaft portion, a second passage for enabling the first passage to communicate with the bottom-side chamber, and check valve means disposed between the first passage and the second passage; whereby a unidirectional flow function is provided to prevent a hydraulic fluid from flowing from the bottom-side chamber into the hydraulic fluid port when the cushion plunger enters the cushion hole while allowing a hydraulic fluid to flow from the hydraulic fluid port into the bottom-side chamber when the cushion plunger is withdrawn from the cushion hole.

With such a structure, the bottom-side cushioning device is can be provided with a centering function as well as a unidirectional flow function using the cushion plunger, and therefore the cushion plunger can enter the cushion hole smoothly following the shape of the cushion hole and a satisfactory performance of withdrawing from the cushion hole is secured.

(15) In the above paragraph (14), preferably, the second passage includes an inner diameter hole formed at an end surface of the cushion plunger at the side of the enlarged base end portion and in which the first passage opens, and a radial small holes for connecting the inner diameter hole to the bottom-side chamber; and the check valve means includes a ball disposed in the inner diameter hole to allow opening/closing of the first passage, and a spring disposed in the inner diameter hole to urge the ball in a direction of closing of the first passage.

By constituting the second passage and the check valve means in such a manner, the unidirectional flow function is obtained, and since the spring urges the cushion plunger against the wall portion of the counter-sunk hole through the ball, the centering of the cushion plunger is maintained once the cushion plunger has been aligned with the cushion hole.

(16) In the above paragraph (14), preferably, the enlarged base end portion of the cushion plunger is a flange portion provided at a base end of the cushion plunger; the piston includes a through-hole and a counter-sunk hole formed in its central portion of an end surface of the piston at the side of the piston rod, the shaft portion of the cushion plunger being inserted in the through-hole with a radial gap and the flange portion being received in the counter-sunk hole between the piston and the end surface of the piston rod with radial and axial gaps; the second passage includes an inner diameter recess formed in an end surface of the cushion plunger at the side of the rod with an outer circumferential end surface portion being left and in which the first passage opens, and a connection passage through which the radial gap between the flange portion and a wall portion of the counter-sunk hole communicates with the bottom-side chamber; the check valve means includes a radial stepped surface of the flange portion at the side of the shaft portion, the outer circumferential end surface portion of the piston rod-side end surface of the cushion plunger, and a portion of the piston-side end surface of the piston rod in contact with the outer circumferential end surface portion; and the inner diameter recess is dimensioned such that an axial hydraulic pressure acting on the outer circumferential end surface portion is lower than an axial hydraulic pressure acting on the radial stepped surface when the cushion plunger enters the cushion hole.

By constituting the second passage and the check valve means in such a manner, the unidirectional flow function is obtained, and since the check valve means is formed by utilizing a hydraulic pressure balance, the number of parts can be reduced, so that an excellent productivity and a high reliability are achieved.

(17) Further, any one of the above paragraphs (8) to (16), preferably, the cushion plunger includes inclined grooves formed in an outer circumferential portion of the cushion plunger so as to be widened toward a front end of the plunger.

By forming the inclined grooves in the cushion plunger in such a manner, the cushioning characteristic can be adjusted, and in particular a change in the restricted opening area in the initial stage when the cushion plunger enters the cushion hole can be reduced, so that the cushioning performance in the initial stage of entering is improved.

(18) In the above paragraph (5), preferably, the bottom-side cushioning device includes a shaft portion protruding from a bottom-side end surface of the piston, a floating type cushion ring loosely fitted on the shaft portion so as to be movable radially and axially, and a stopper plug provided at an end of the shaft portion, and the cushion ring providing a centering function to bring the cushion ring into an axial alignment with the cushion hole when the cushion ring enters the cushion hole and a unidirectional flow function to prevent a hydraulic fluid from flowing from the bottom-side chamber into the hydraulic fluid port when the cushion ring enters the cushion hole while allowing a hydraulic fluid to flow from the hydraulic fluid port into the bottom-side chamber when the cushion ring is withdrawn from the cushion hole.

With such a structure, the bottom-side cushioning device can be provided with a centering function as well as a unidirectional flow function using the cushion ring, and therefore the cushion ring can enter the cushion hole smoothly following the shape of the cushion, and a satisfactory performance of withdrawing from the cushion hole is secured.

(19) In any one of the above paragraphs (5) to (18), preferably, the hydraulic cylinder further comprises a rod-side cushioning device including a floating type cushion ring loosely fitted on a portion of the piston rod adjacent to the piston so as to be movable radially and axially, the cushion ring entering a cushion hole connected to a rod-side hydraulic fluid port of the cylinder body thereby to reduce a shock at a stroke end when the piston rod is moved to extend.

By providing the rod-side cushioning device in such a manner, a shock at the stroke end upon extending of the piston rod is reduced, and the centering function as well as the unidirectional flow function are obtained.

(20) Further, in any one of the above paragraphs (5) to (18), preferably, the hydraulic cylinder further comprises a rod-side cushioning device including a cushion ring of a fixed type united with the piston as one body, the cushion ring entering a cushion hole connected to a rod-side hydraulic fluid port of the cylinder body thereby to reduce a shock at a stroke end when the piston rod is moved to extend.

By providing the rod-side cushioning device in such a manner, a shock at the stroke end upon extending of the piston rod is also reduced.

Further, the number of parts with respect to the rod-side cushioning device can be reduced, and in particular when the rod-side cushioning device is combined with the aforementioned paragraph (13), since the cushioning members both of the rod side and in the bottom side are united with the piston as one body, the number of parts can be minimized.

BRIEF DESCRIPTION OF THE DRAWINGS

FIG. 25A is a top view of an inclined groove, and FIG. 25B is a side view of the inclined groove;

BEST MODE FOR CARRYING OUT THE INVENTION

Embodiments of the present invention will be described below with reference to the drawings.

Figure 1:
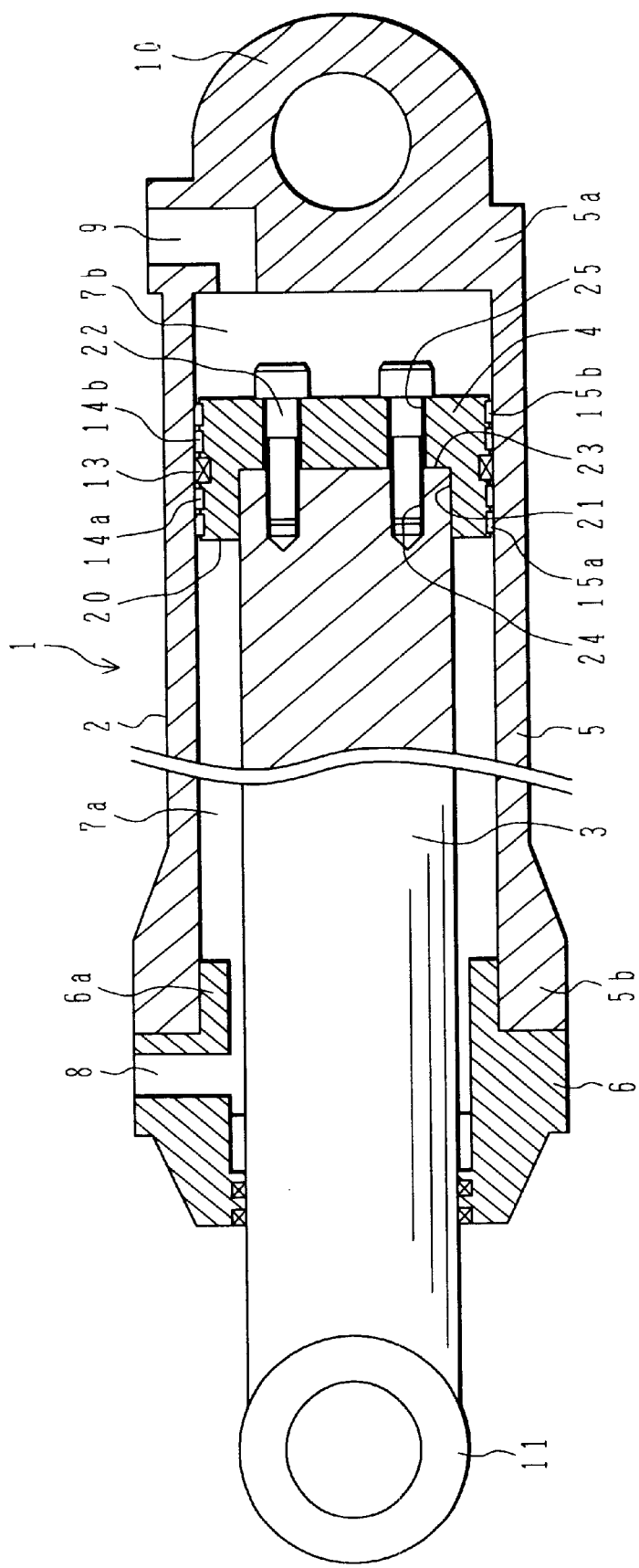
FIG. 1 is a sectional view of a hydraulic cylinder according to a first embodiment of the present invention.

FIG. 1 shows a hydraulic cylinder according to a first embodiment of the present invention. The hydraulic cylinder 1 comprises a cylinder body 2, a piston rod 3, and a piston 4. The cylinder body 2 is constituted by a cylinder tube 5 closed at one end portion 5a and opened at the other end portion 5b, and a rod-side cylinder head 6 fixed to the opened end portion 5b of the tube 5. The piston rod 3 passes through the rod-side cylinder head 6 so as to extend to the inside and outside of the tube 5. The piston 4 is connected to an end of the piston rod 3 located in the inside of the cylinder body 2 so as to be slidable in the tube 5 to divide the inside of the cylinder body 2 into a rod-side chamber 7a and a bottom-side chamber 7b. A seal ring 13, wear rings 14a and 14b and contamination seals 15a and 15b are provided in the outer circumference of the piston 4. A hydraulic fluid supply and discharge port 8 for the chamber 7a is provided in the rod-side cylinder head 6. A hydraulic fluid supply and discharge port 9 for the chamber 7b is provided in the closed end portion 5a of the tube 5.

When a hydraulic fluid is supplied to the bottom-side chamber 7b through the supply and discharge port 9 while the supply and discharge port 8 communicating with the rod-side chamber 7a is connected to a tank, the piston 4 slides toward the rod-side cylinder head 6 in the left in FIG. 1. As a result, the piston rod 3 is moved so as to extrude from the cylinder body 2, so that the hydraulic cylinder 1 extends. When a hydraulic fluid is contrariwise supplied to the rod-side chamber 7a through the supply and discharge port 8 while the supply and discharge port 9 communicating with the bottom-side chamber 7b is connected to a tank, the piston 4 slides toward the closed end portion 5a of the tube 5 in the right in FIG. 1. As a result, the piston rod 3 is moved so as to be withdrawn into the cylinder body 2, so that the hydraulic cylinder 1 contracts. A mount portion 10 is provided at the closed end portion 5a of the tube 5 in the cylinder body 2, and a mount portion 11 is provided at an outer end of the piston rod 3, and one of the mount portions 10 and 11 is pivotally connected to a stationary member while the other is pivotally connected to a movable member so that the movable member can be driven.

A piston connecting structure which features the present invention will be described below.

Figure 2:
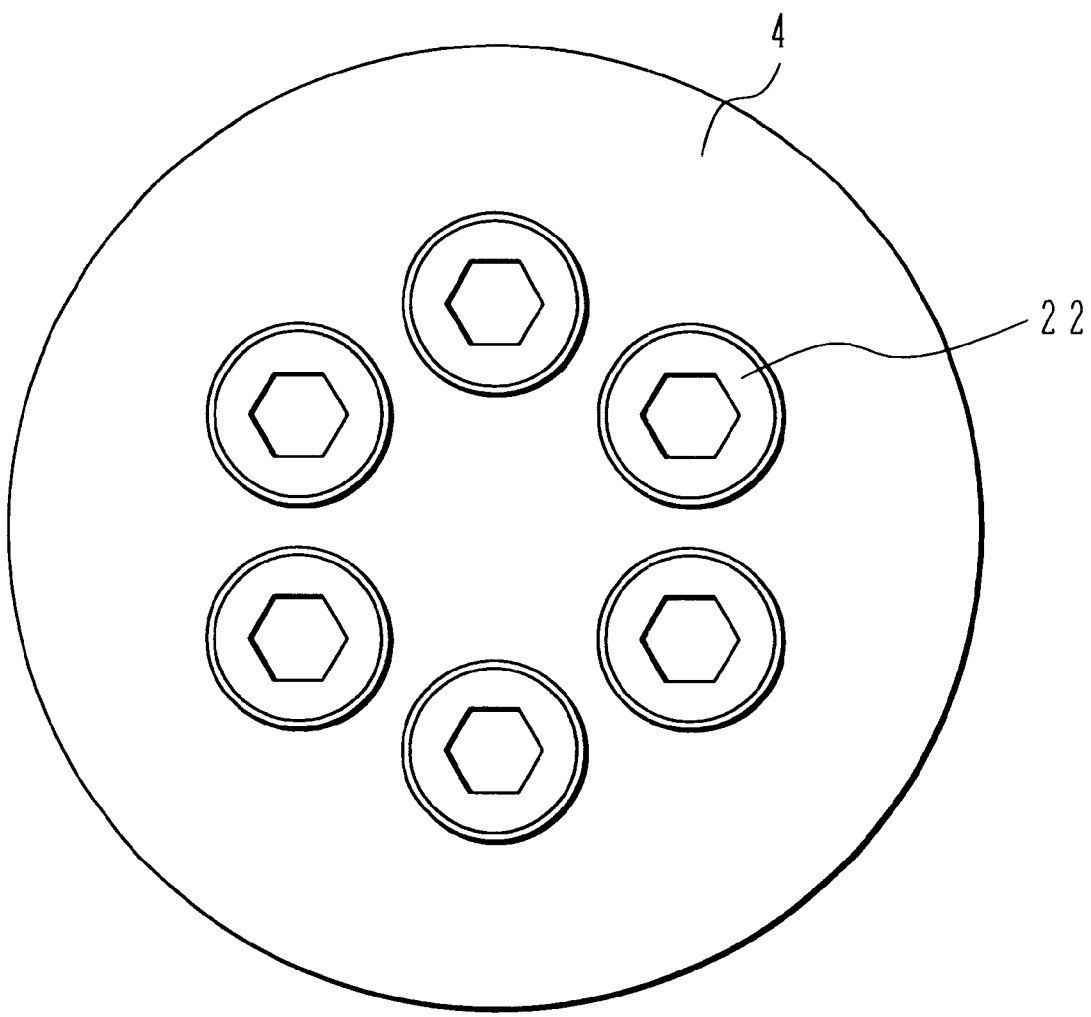
FIG. 2 is a front view of the piston connecting portion depicted in FIG. 1.

A recess 21 as an axial fitting portion is formed in an end surface 20 of the piston 4 at the side of the piston rod 3, and the end of the piston rod 3 is fitted into the recess 21, so that the piston 4 is connected with the piston rod 3 while ensuring a coaxial relationship therewith. Further, axial threaded holes 24 are formed in an end surface 23 of the piston rod 3, and axial bolt holes 25 are formed in the piston 4. The end surface 20 of the piston 4 is disposed in a face-to-face contact with the end surface 23 of the piston rod 3, and in this condition bolts 22 are inserted through the bolt holes 25 and screwed into the threaded holes 24 so that the piston 4 is fixed and connected to the piston rod 3. A suitable number of bolts 22 may be used. In this embodiment, six bolts 22 are used as shown in FIG. 2. Although this embodiment shows the bolts 22 as round-head bolts, the bolts 22 may be hexagonal-head bolts.

In the piston connecting structure in this embodiment, since the piston 4 is connected to the piston rod 3 directly by the bolts 22, the force applied to the piston 4 is received by the plurality of bolts 22. At this time, though a tensile stress acts on the bolts 22, a sufficient strength can be obtained even if the bolts 22 are formed of a usual material. Further, since the screw portion of each of the threaded holes 24 in the piston rod 3 is constituted by a female screw, there is no problem in strength even if the piston rod 3 is formed of a usual piston rod material.

According to this embodiment, the following advantages are obtained.

Figure 27:
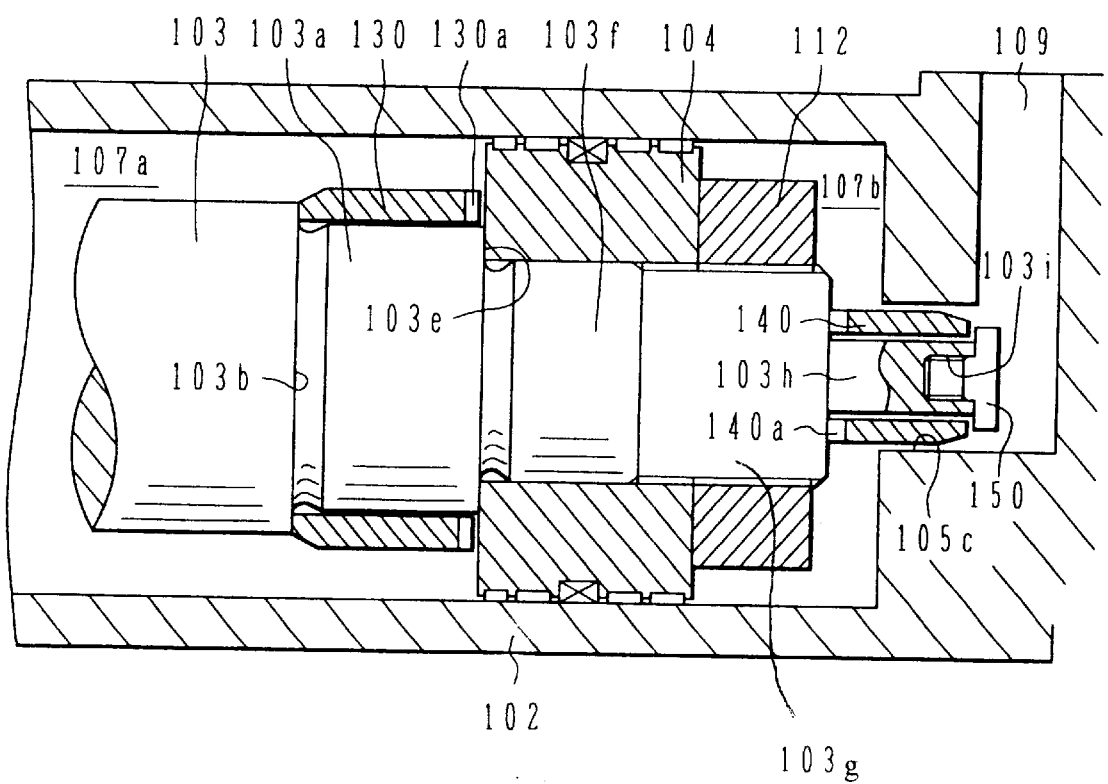
FIG. 27 is a sectional view of a main part of a conventional hydraulic cylinder with a cushioning device.

1) In the conventional general piston connecting structure shown in FIG. 27, the male screw portion 103g (see FIG. 27) needs to be provided in the piston rod. Accordingly, a high-strength material has to be used for the piston rod because tensile stress acts on the male screw portion 103g. On the contrary, in the piston connecting structure according to the present invention, since it is unnecessary to provide any male screw portion in the piston rod 3, it is unnecessary not only to use any high-strength material for the piston rod 3 but also to provide any heat treatment in order to improve the strength, and therefore the piston rod 3 can be produced using an inexpensive material at a low cost.

2) In the conventional structure, a tensile stress acts on the male screw portion of the piston rod, but, in the present invention, a tensile stress acts on the bolts 22. In this respect, the strength of the bolts 22 is large even if the bolts 22 are formed of a usual material, and it is easy to form the bolts 22 using a stronger material, and therefore the strength of the piston connecting portion can be improved with a simple structure, so that the life of the piston rod can be improved greatly.

3) Fatigue strength against an external force is also improved because of the rod fixed by the bolts 22.

Figure 28:
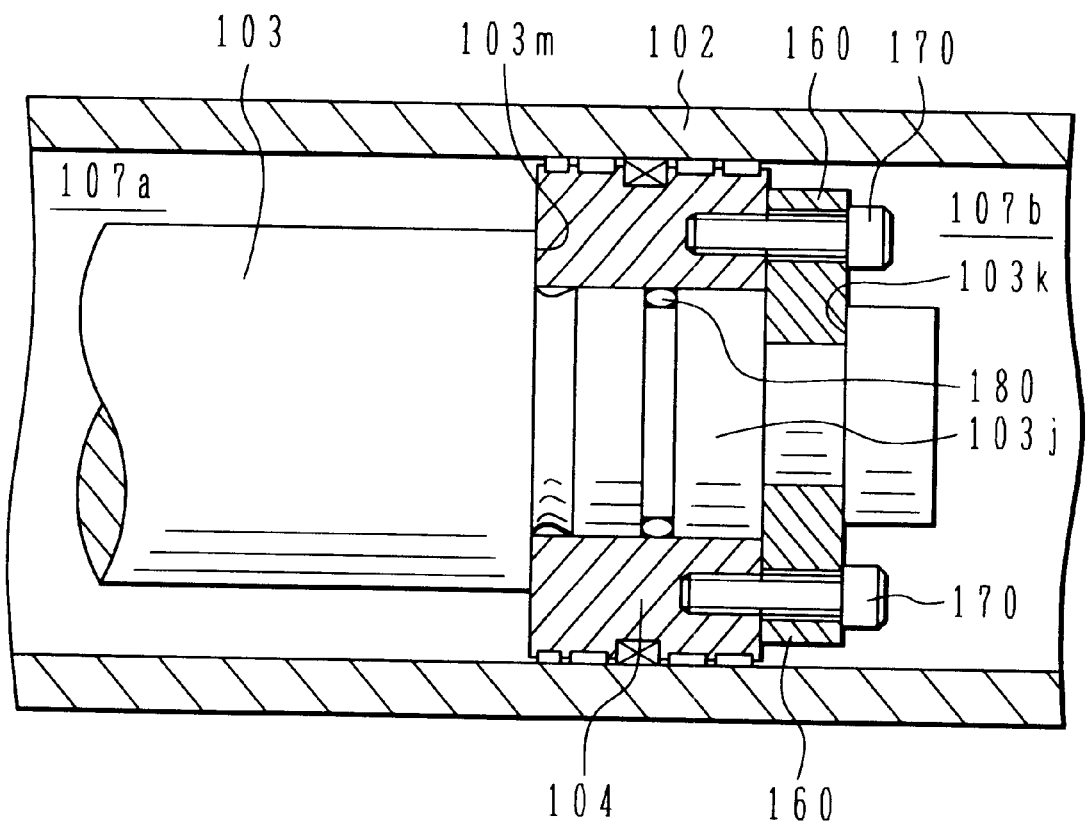
FIG. 28 is a sectional view showing a piston connecting structure of a conventional hydraulic cylinder.
Figure 29:
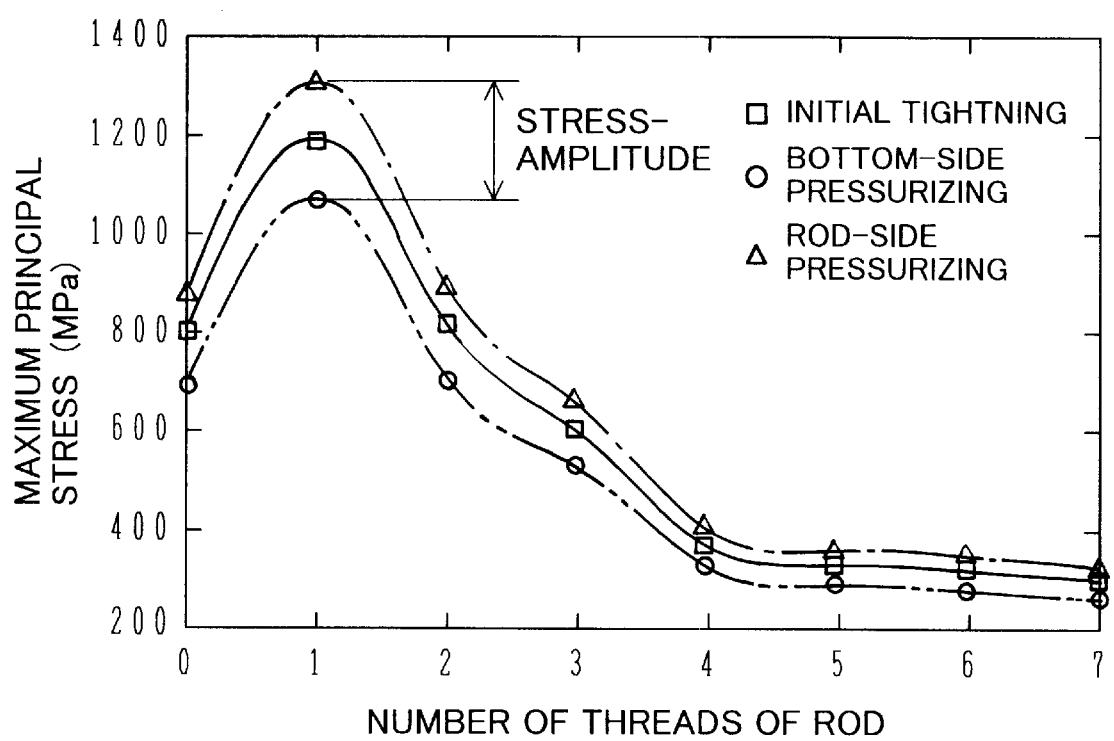
FIG. 29 is a graph showing a state of stress acting on a male screw portion of a piston rod.

4) In the conventional piston connecting structure shown in FIG. 28, the number of parts is large because the two flanges 160 and the O-ring 180 are required. On the contrary, in the present invention, the piston connecting structure can be constituted by the minimum number of parts because the aforementioned parts are not required.

5) Since the conventional small-diameter piston insertion portion is not required, a round rod having no stepped portion can be used as a piston rod, and therefore the problem of damage at the stepped portion is eliminated.

6) The total length of the rod is determined by a length up to the heads of the bolts 22, and therefore the effective stroke of the hydraulic cylinder 1 can be longer than the conventional case where the large nut 112 is used.

7) Since the plurality of bolts 22 are used, torque for tightening each bolt can be reduced, and therefore it is easy to assemble and disassemble the piston connecting structure.

8) In the conventional structure, the rod and piston assembly is often disassembled to perform maintenance upon servicing. When, for example, the rod-side cylinder head or the rod seal attached to the cylinder head is to be exchanged to a new one, the nut 112 (see FIG. 27) has to be removed, and at that time the hydraulic cylinder had to be placed on an exclusive machine to loosen the nut. The torque for fastening the nut 112 is about 1000 kgf·m. On the contrary, in the present invention, a torque for tightening one bolt 22 is small to be about 70 kgf·m. Accordingly, the bolts 22 can be loosened manually, and therefore a high serviceability is obtained because the bolts can be loosened without any large-scale exclusive machine.

Other embodiments of the present invention will be described below with reference to FIGS. 3 through 12. In FIGS. 3 through 12, parts equivalent to those shown in FIG. 1 are referenced correspondingly.

Figure 3:
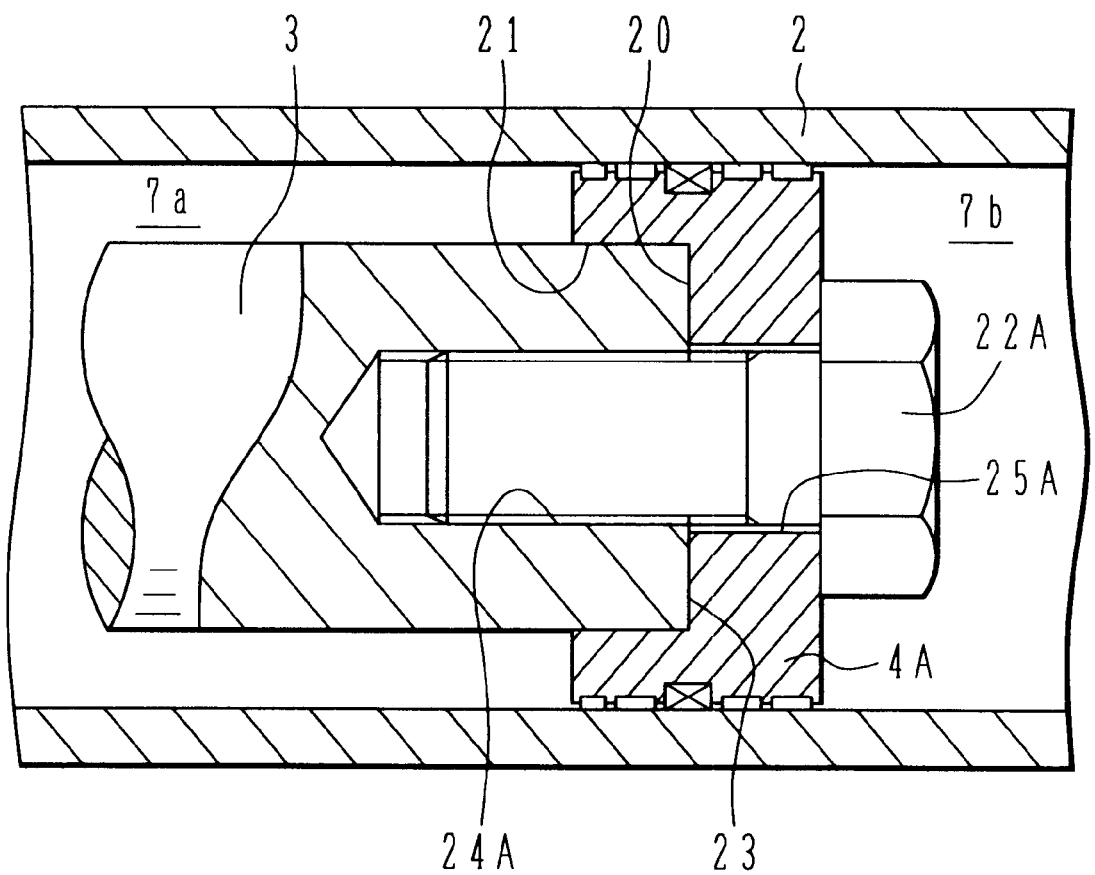
FIG. 3 is a sectional view of a main part of a hydraulic cylinder according to a second embodiment of the present invention.

FIG. 3 shows a second embodiment of the present invention. In FIG. 3, a piston 4A is connected to the piston rod 3 by a single bolt 22A. In this case, the bolt 22A is preferably constituted by a hexagonal-head bolt as shown in FIG. 3 because a large clamping force required for the connection has to be applied to one bolt.

Figure 4:
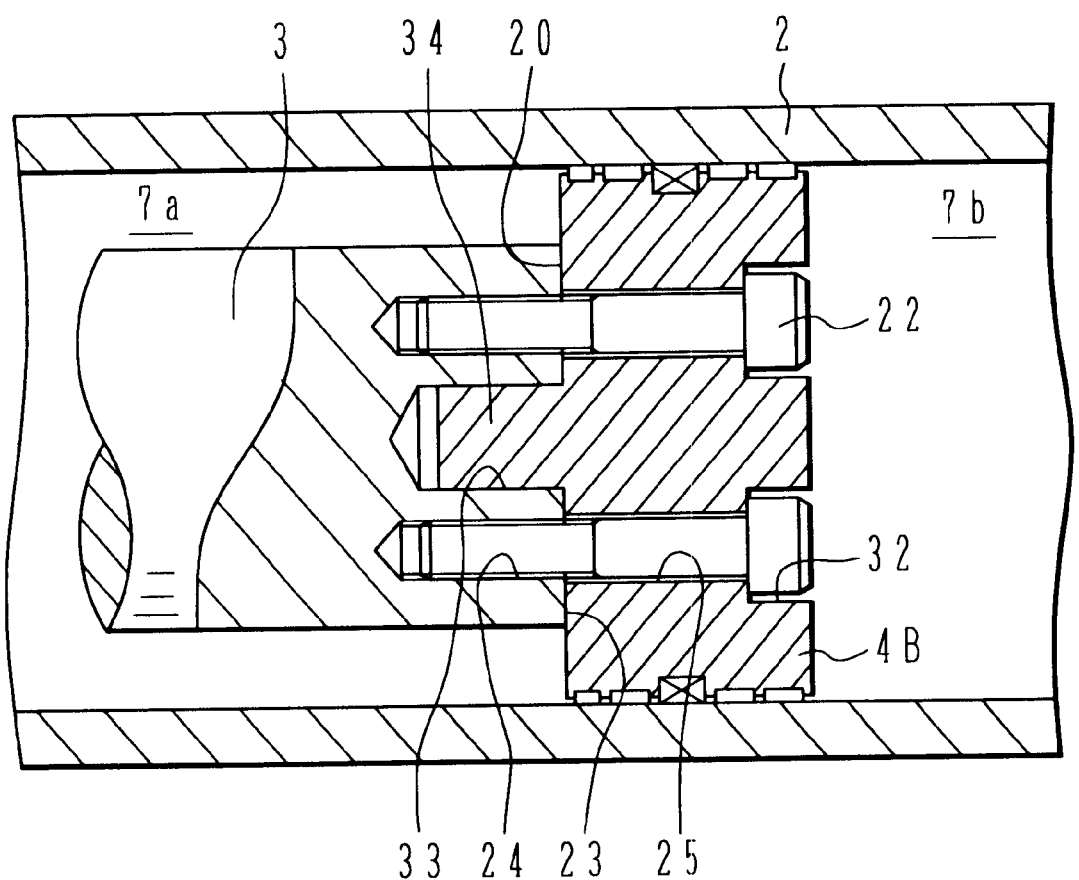
FIG. 4 is a sectional view of a main part of a hydraulic cylinder according to a third embodiment of the present invention.

FIG. 4 shows a third embodiment of the present invention. In FIG. 4, a hole 33 as an axial fitting portion is formed at the central portion of the end surface 23 of the piston rod 3 and a protrusion 34 as an axial fitting portion is provided at the central portion of the end surface 20 of a piston 4B. The protrusion 34 is fitted into the hole 33 so that a coaxial relationship between the piston rod 3 and the piston 4B is ensured. Further, counter-sunk holes 32 for receiving the heads of the bolts 22 respectively are formed in opened portions of the bolt holes 25 in the piston 4B at the side of the chamber 7b so that the heads of the bolts 22 do not project from the end surface of the piston 4B.

Figure 5:
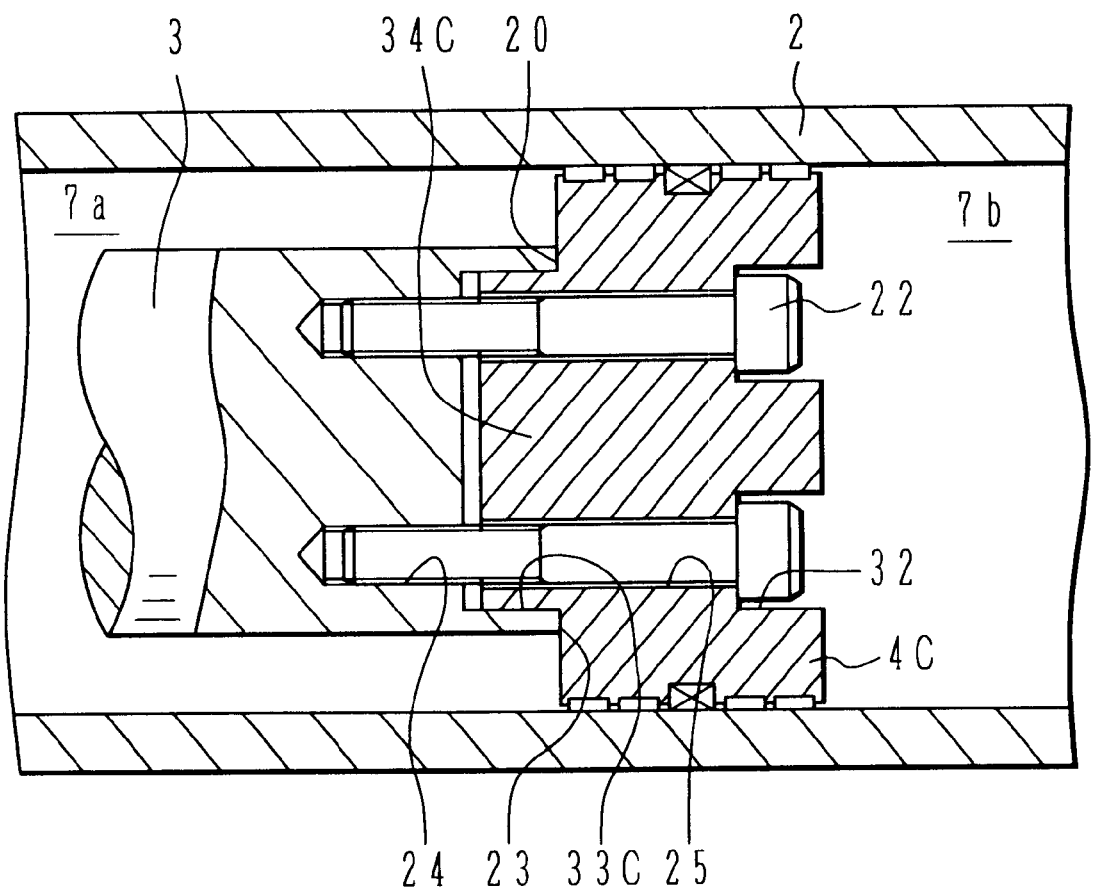
FIG. 5 is a sectional view of a main part of a hydraulic cylinder according to a fourth embodiment of the present invention.

FIG. 5 shows a fourth embodiment of the present invention. In FIG. 5, the hole 33 and the protrusion 34 as fitting portions shown in FIG. 4 are enlarged to form a hole 33C and a protrusion 34C respectively. Threaded holes 24 and bolt holes 25 for the bolts 22 are formed in the hole 33C and the protrusion 34C respectively.

Figure 6:
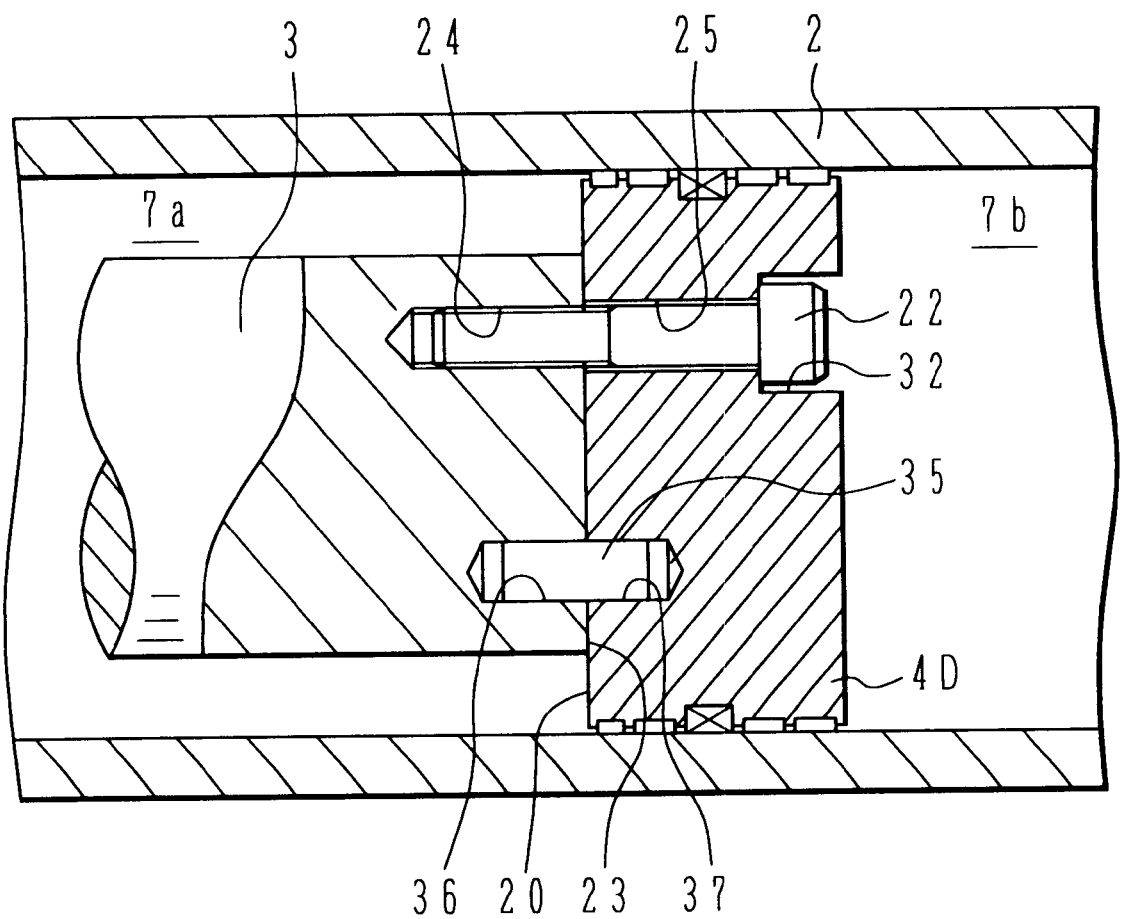
FIG. 6 is a sectional view of a main part of a hydraulic cylinder according to a fifth embodiment of the present invention.
Figure 7:
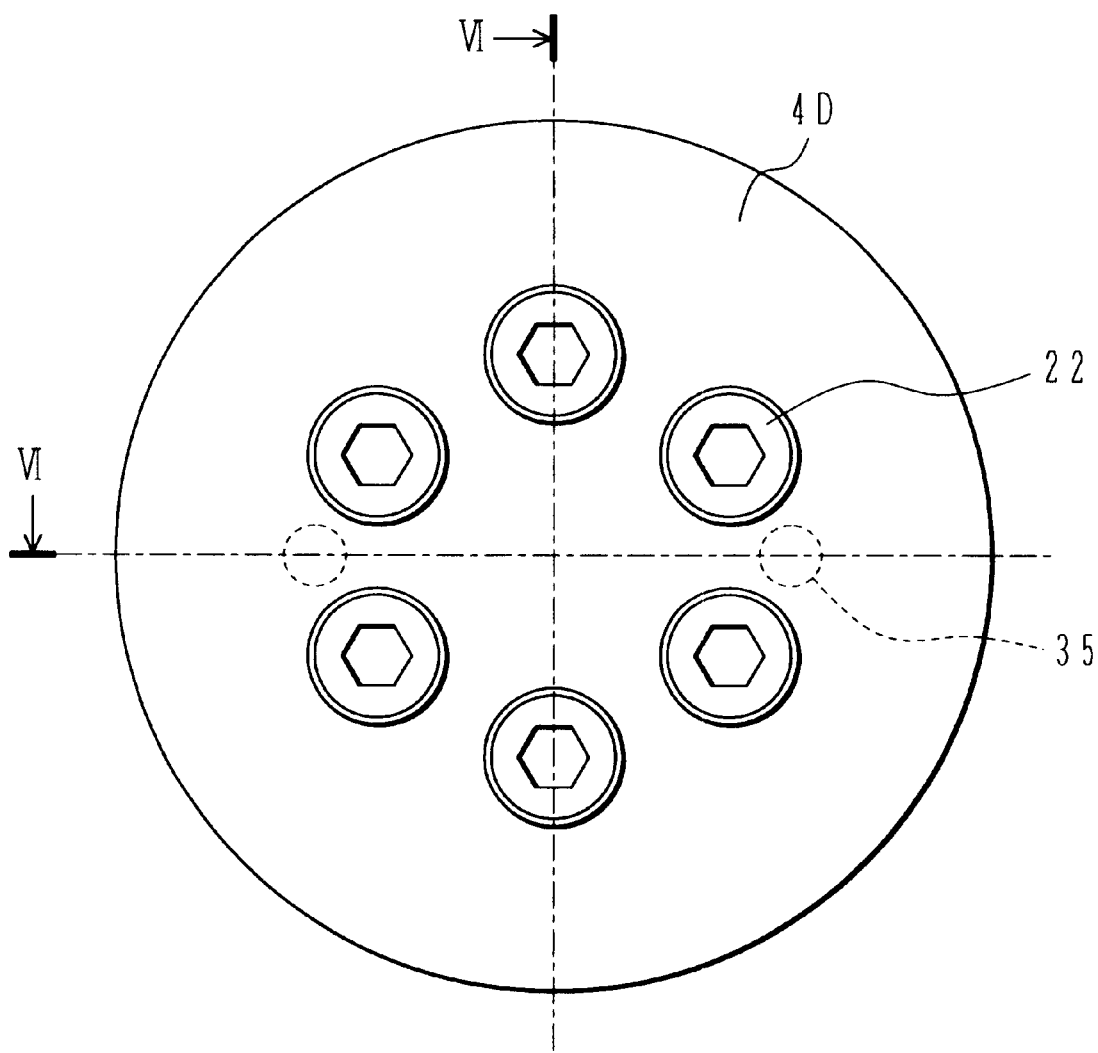
FIG. 7 is a front view of the piston connecting portion depicted in FIG. 6.

FIG. 6 shows a fifth embodiment of the present invention. In FIG. 6, pins 35 are used in place of the fitting portions to perform positioning to ensure the coaxial relationship between the piston rod 3 and a piston 4D. In this case, there are used two pins 35 arranged on a diametrical line symmetrically as shown in FIG. 7. Further, upon assembling, pin-holes 36 and 37 are previously formed in the end surfaces 20 and 23 respectively by drilling while the piston rod 3 is retained coaxially with the piston 4D, and then pins 35 are forced into ones of the pin-holes 36 and 37 before the same are forced into the other pin-holes to perform positioning, and in this condition the piston 4D is fixed by the bolts 22.

According to the embodiment shown in FIG. 3, the aforementioned advantages 1) to 6) are obtained.

According to the embodiments shown in FIGS. 4 to 6, the aforementioned advantages 1) to 8) are obtained and further with respect to the advantage 6), the effective stroke of the hydraulic cylinder 1 can be longer because the length of the rod as a whole is determined by a length to the end surface of the piston.

FIGS. 8 to 12 show sixth to tenth embodiments of the present invention in which a floating type rod-side cushion ring is applied to the embodiments shown in FIG. 1 and FIGS. 3 to 6.

Figure 8:
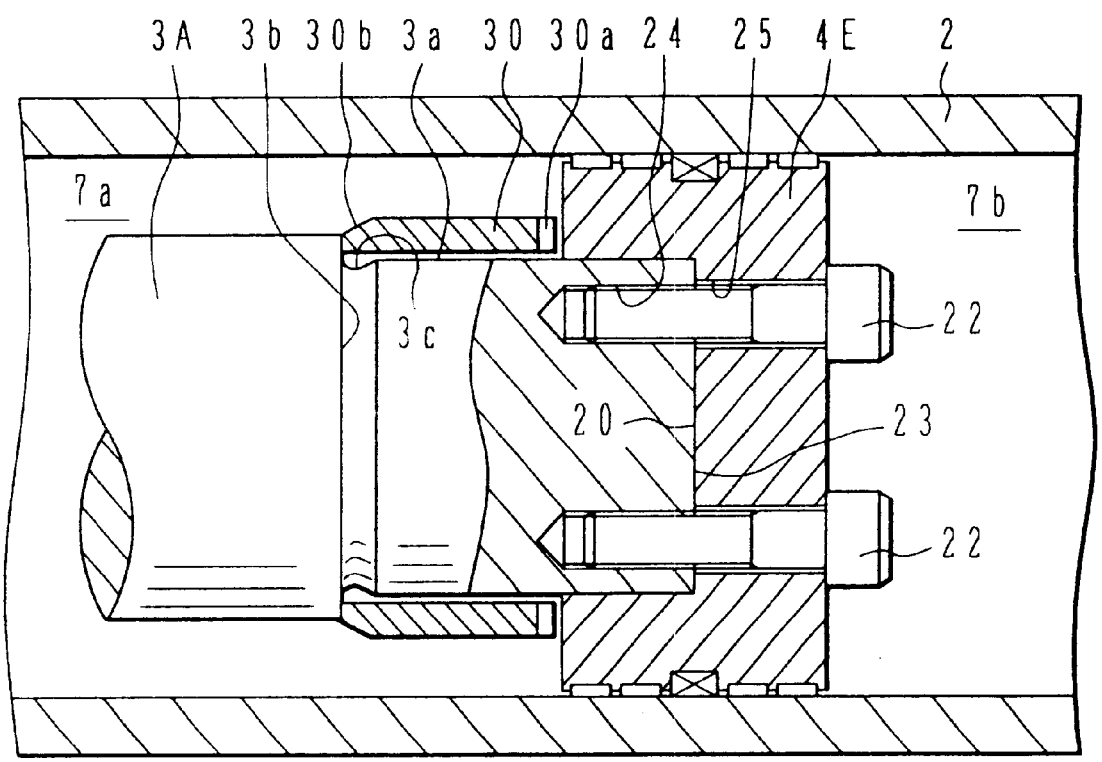
FIG. 8 is a sectional view of a main part of a hydraulic cylinder according to a sixth embodiment of the present invention.

In FIG. 8, a small-diameter ring insertion portion 3a is provided at an end portion of a piston rod 3A with a stepped portion 3b formed as a boundary. A cushion ring 30 is loosely fitted on the ring insertion portion 3a so as to be movable radially and axially. A piston 4E is fixed to an end of the ring insertion portion 3a by bolts 22 in the same manner as in the embodiment shown in FIG. 1. A R-curved portion 3c is formed in the end portion of the ring insertion portion 3a at the side of the stepped portion 3b to serve as an undercut when the ring insertion portion 3a is polished. Further, a plurality of grooves 30a through the thickness of the cushion ring 30 are formed in the cushion ring 30 at the side of the piston 4D. A taper portion 30b is formed at the end portion of the cushion ring 30 at the side of the piston rod. The floating type cushion ring 30 is provided to reduce a shock at the stroke end when the hydraulic cylinder extends.

That is, when the hydraulic cylinder extends, the rod-side cushion ring 30 enters, from the taper portion 30b, into a cushion hole 6b provided at an inner end portion 6a of the rod-side cylinder head 6 in the vicinity of the stroke end, and this restrict the hydraulic fluid passage in the cushion hole 6b (see FIG. 13); this is the same herein below to generate a cushioning pressure in the chamber 7a so that the stroke speed is reduced and thus a shock at the stroke end is reduced. At this time, since the cushion ring 30 is movable radially and axially and thus the taper portion 30b of the cushion ring 30 enters the cushion hole 6b following the shape of the cushion hole 6b, there is no fear of biting between the cushion ring 30 and the cushion hole 6b. Further, upon entering of the taper portion 30b into the cushion hole 6b, a cushioning pressure is generated in the chamber 7a and this establishes a pressure difference between the portion of the cushion ring 30 at the side entering the hole 6b and the portion of the cushion ring 30 at the side of the piston 4E (at the side of the chamber 7a) so that the cushion ring 30 is pressed against an end surface of the stepped portion 3b so as to come into tight contact therewith. Accordingly, a hydraulic fluid is prevented from flowing into the supply and discharge port 8 through a gap between the ring insertion portion 3a and an inner circumferential surface of the cushion ring 30. When the piston rod 3A begins to move in a contracting direction (to the right in FIG. 8) after the stroke end is reached and the cushion ring 30 is withdrawn from the cushion hole 6b, a hydraulic fluid from the supply and discharge port 8 flows into the chamber 7a through a gap between an outer circumferential surface of the cushion ring 30 and an inner circumferential surface of the cushion hole 6b. At this time, the cushion ring 30 is pressed against the piston 4E by the hydraulic pressure of the fluid supplied from the supply and discharge port 8. However, since the grooves 30a are provided in the piston-side end surface of the cushion ring 30, a hydraulic fluid flows into the gap between the ring insertion portion 3a and the inner circumferential surface of the cushion ring 30 and further flows into the chamber 7a through the grooves 30a. Thus, the cushion ring 30 is satisfactorily withdrawn from the cushion hole 6b.

Figure 9:
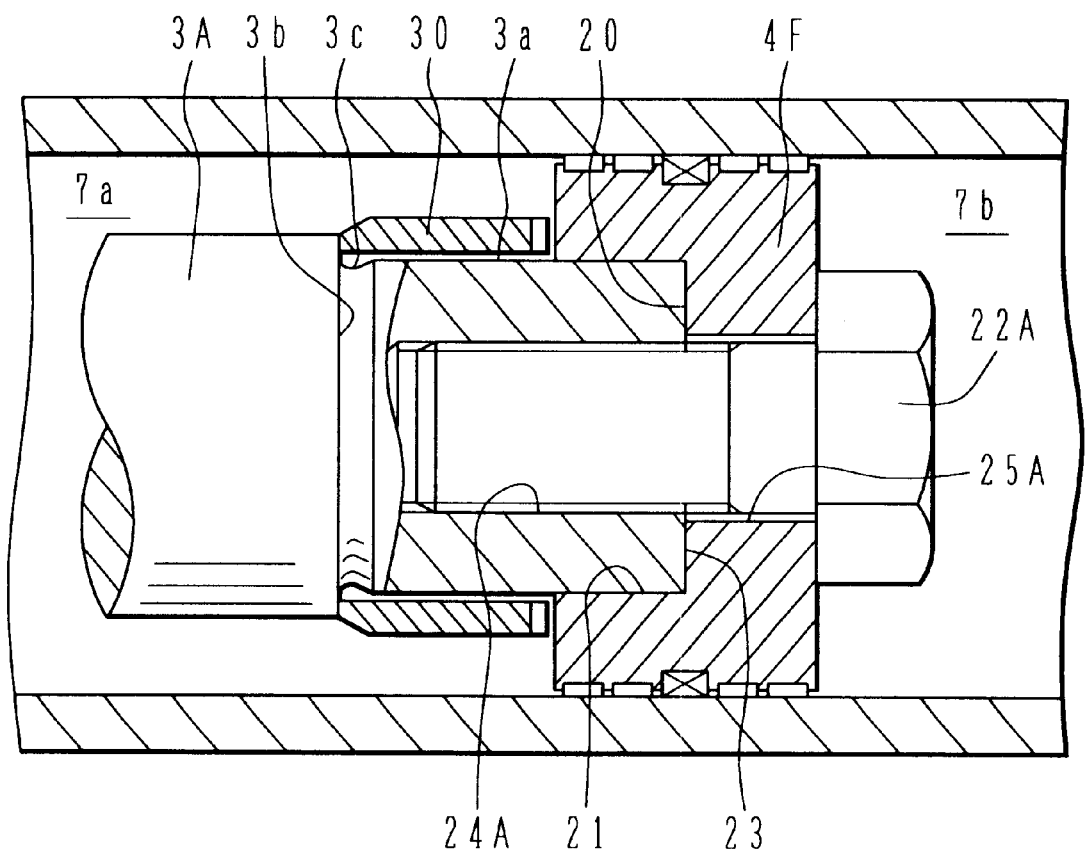
FIG. 9 is a sectional view of a main part of a hydraulic cylinder according to a seventh embodiment of the present invention.
Figure 10:
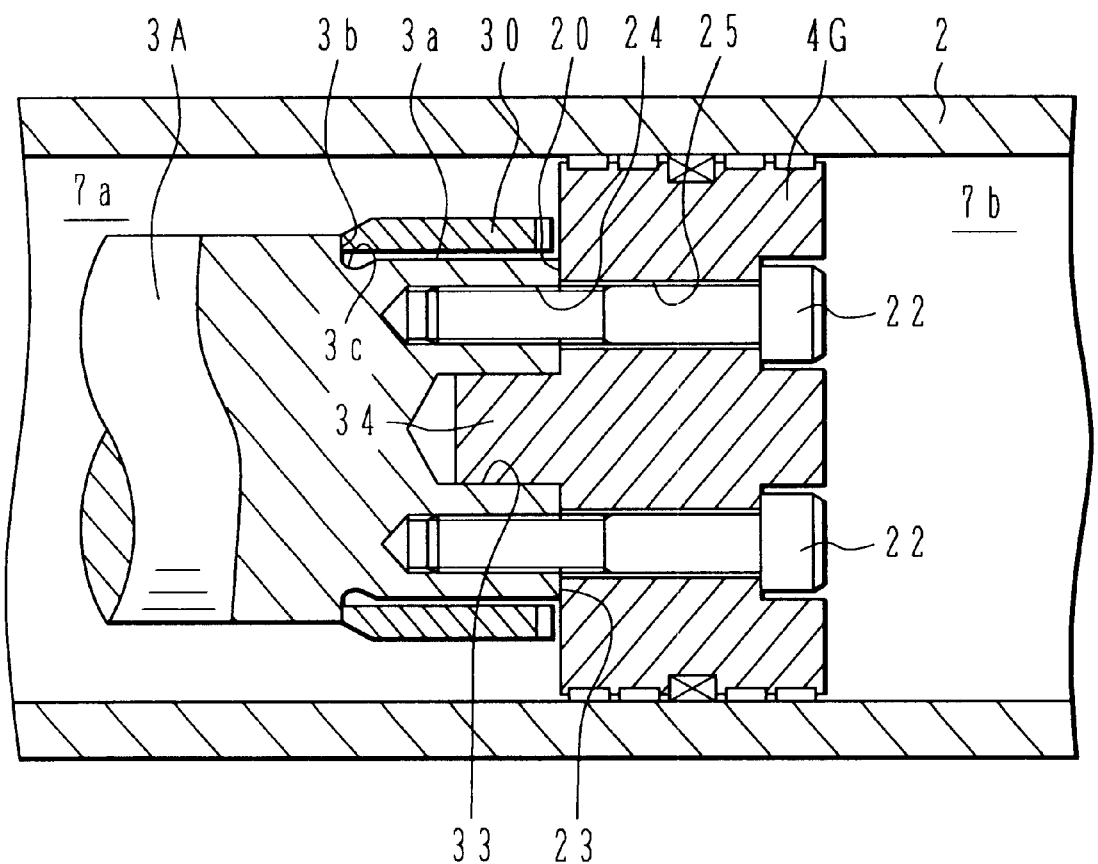
FIG. 10 is a sectional view of a main part of a hydraulic cylinder according to an eighth embodiment of the present invention.
Figure 12:
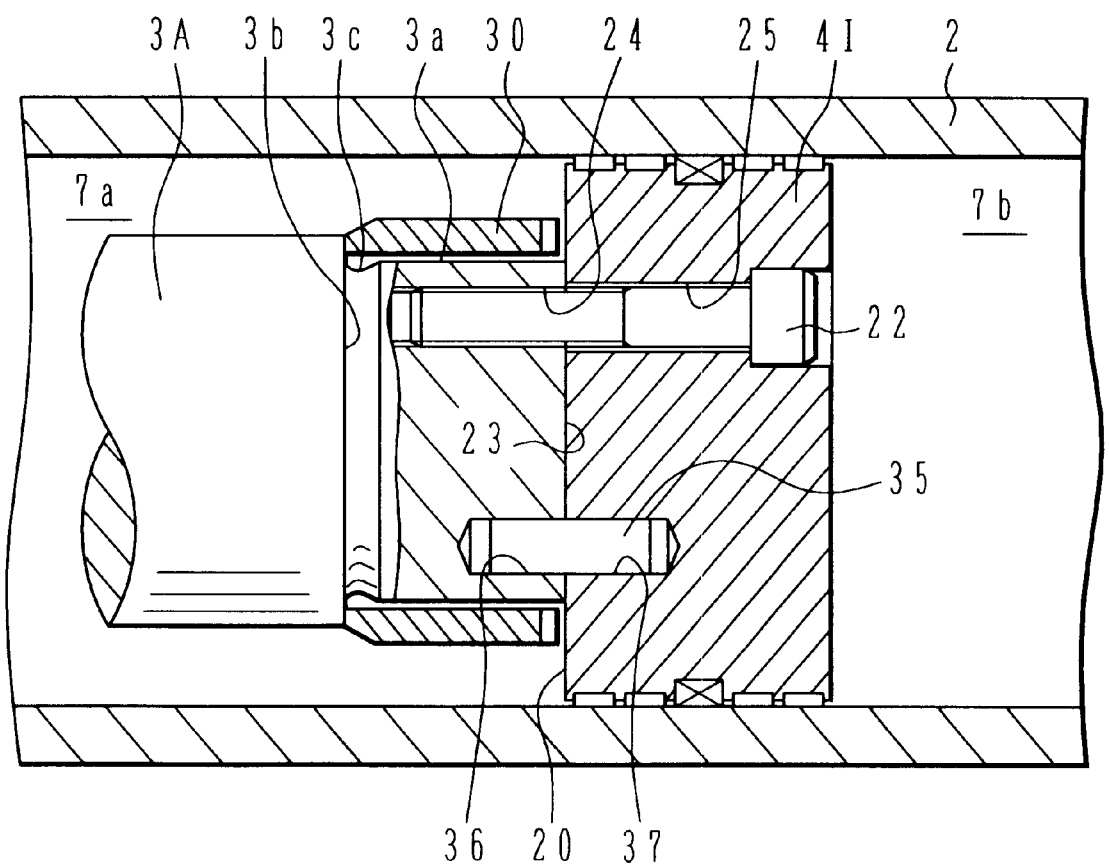
FIG. 12 is a sectional view of a main part of a hydraulic cylinder according to a tenth embodiment of the present invention.

Also in the embodiments shown in FIGS. 9, 10 and 12, similarly, the small-diameter ring insertion portion 3a is provided and the cushion ring 30 is loosely fitted on the ring insertion portion 3a, and further a piston 4F, 4G or 4I is fixed to an end of the ring insertion portion 3a by bolts 22 or a bolt 22A.

Figure 11:
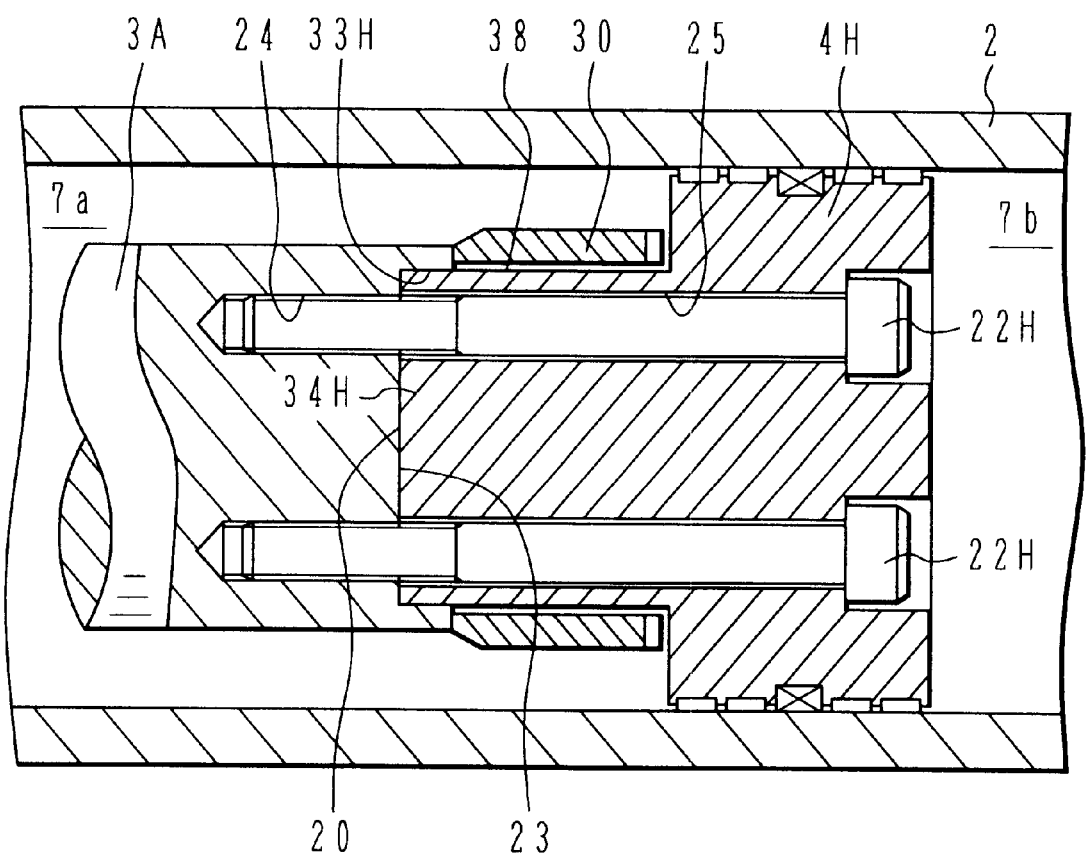
FIG. 11 is a sectional view of a main part of a hydraulic cylinder according to a ninth embodiment of the present invention.

In an embodiment shown in FIG. 11, the protrusion 34C of the piston 4C shown in FIG. 5 is elongated to form a piston 4H having a shaft portion 34H. A ring insertion portion 38 is formed on the shaft portion 34H. An end of the shaft portion 34H is fitted into a hole 33H formed in the end surface 23 of the piston rod 3A to provide an axial fitting portion. The piston 4H is fixed by bolts 22H to the piston rod 3A.

When a floating type cushion ring is to be inserted in the conventional piston connecting structure shown in FIG. 27, the piston insertion portion 103f (see FIG. 27) of the piston rod has to be provided as a smaller-diameter portion at the end of the small-diameter ring insertion portion 103a. Accordingly, the screw size of the male screw portion 103g of the piston insertion portion 103f becomes smaller so that it is more difficult to keep the piston insertion portion 103f strong.

In the embodiments shown in FIGS. 8 to 10 and FIG. 12, it is sufficient to provide only the ring inserting portion 3a as a small diameter portion and it is not necessary to provide a small diameter portion for insertion of the piston. Accordingly, it is possible to obtain the advantages mentioned in the embodiments shown in FIGS. 1 and 2 to 6, including that the piston rod 3A can be produced at a low cost in the cylinder having a floating type cushion ring.

In the embodiments shown in FIGS. 8 to 10 and FIG. 12, the life of the piston rod is improved greatly because the male screw portion as the weakest portion of the rod is eliminated. However, since the ring insertion portion 3a is provided, there may arise a problem in the strength of the stepped portion 3b and the R-curved portion 3C formed as a result of the presence of the ring insertion portion 3a if any problem occurs in the piston rod. When the piston operates, concentrated stress acts on the stepped portion 3b and the R-curved portion 3c repetitively so that they may be apt to break. In the embodiment shown in FIG. 11, the ring insertion portion 38 is provided on the elongated shaft portion 34H of the piston 4H utilizing the structure of the embodiment shown in FIG. 5 so that the ring insertion portion 3a on the side of the piston rod 3A is also eliminated. Accordingly, the piston rod 3A can be constituted by a round rod having a uniform diameter on its whole length, and thus the problem in breaking of the rod per se is eliminated, so that the life of the piston rod can be improved more greatly.

Figure 13:
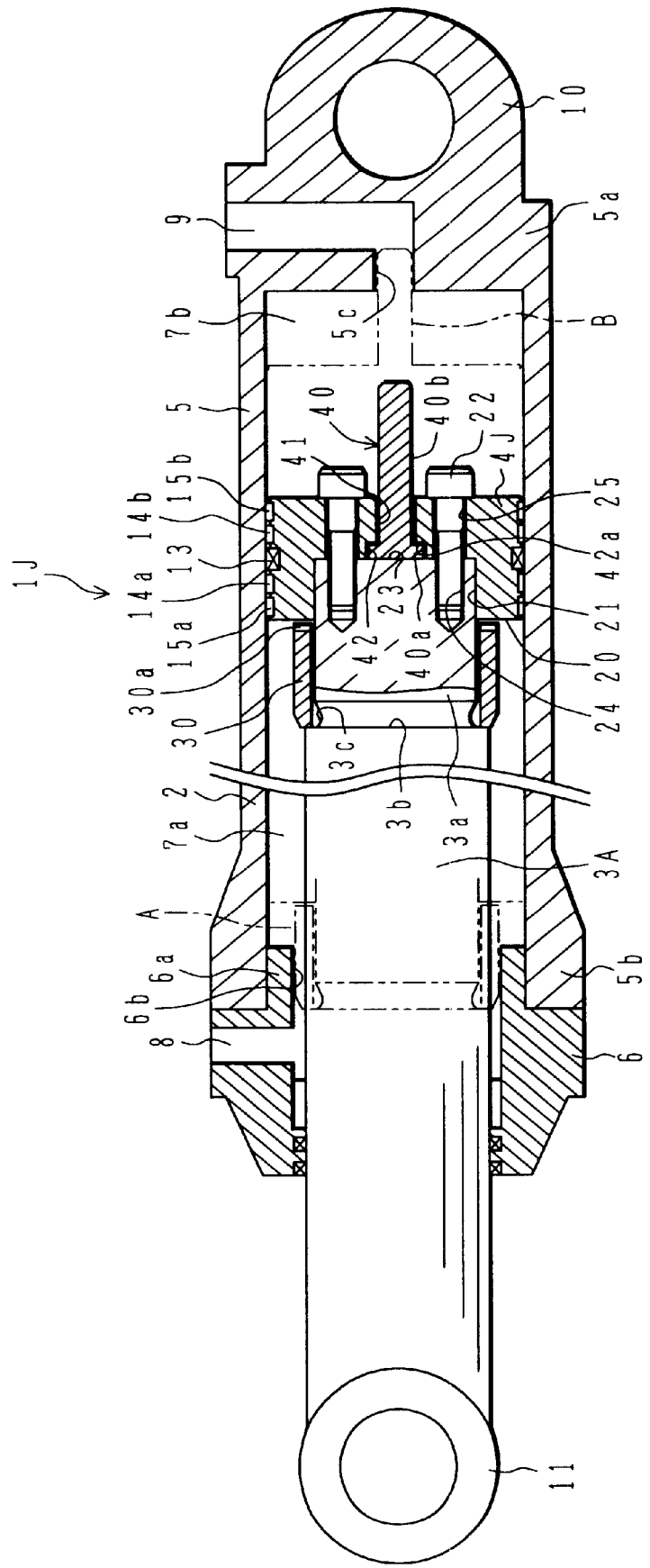
FIG. 13 is a sectional view of a hydraulic cylinder according to an eleventh embodiment of the present invention.
Figure 14:
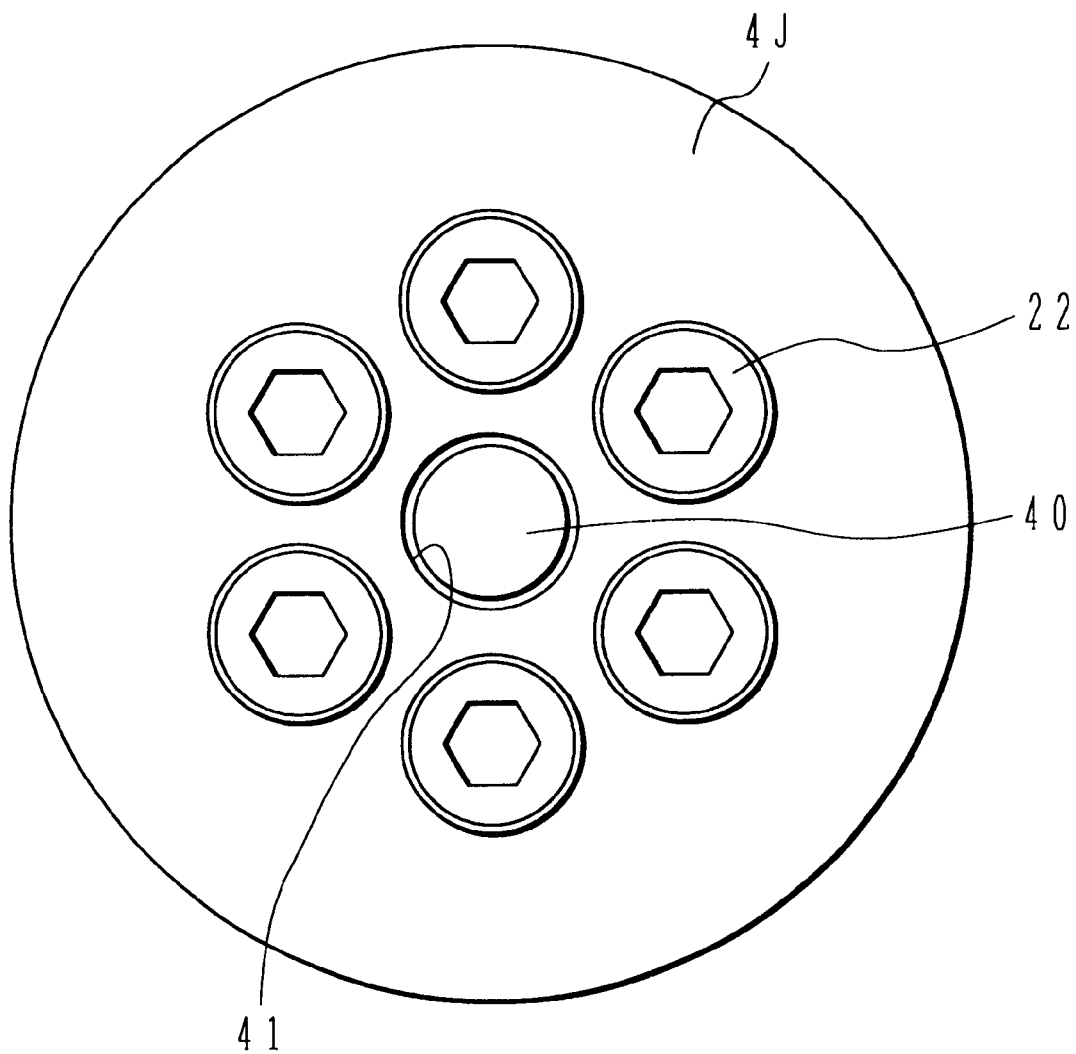
FIG. 14 is a front view of the piston connecting portion depicted in FIG. 13.

An eleventh embodiment of the present invention will be described below with reference to FIGS. 13 and 14. In FIGS. 13 and 14, parts equivalent to those shown in FIGS. 1 and 8 are referenced correspondingly.

The basic structure of a hydraulic cylinder 1J shown in FIG. 13 is the same as that of the hydraulic cylinder 1 shown in FIG. 1.

The piston connecting structure is configured in the same manner as in the embodiment shown in FIG. 8 in that the small-diameter ring insertion portion 3a is provided at an end portion of the piston rod 3A and an end of the ring insertion portion 3a of the piston rod 3A (hereinafter referred to as an "end of the piston rod 3") is fitted into the recess 21 provided in the end surface 20 of a piston 4J at the side of the piston rod 3A, and the piston rod 3A is connected to the piston 4J by bolts 22.

The rod-side cushioning device in this embodiment is also the same as that in the embodiment shown in FIG. 8. That is, the rod-side cushion ring 30 is loosely fitted on the ring insertion portion 3a provided at the end portion of the piston rod 3A so as to be movable radially and axially.

In the hydraulic cylinder 1J according to this embodiment, a bottom-side cushioning device is further provided as follows.

In FIG. 13, the reference numeral 40 designates a bottom-side cushion plunger. A flange portion 40a is provided at a base end of the cushion plunger 40. A through-hole 41 is formed in the center of the piston 4J through which a shaft portion 40b of the cushion plunger 40 passes. A counter-sunk hole 42 is formed around the through-hole 41 at the side of the recess 21 for receiving the flange portion 40a of the cushion plunger 40. The diameter of the through-hole 41 and the diameter of the counter-sunk hole 42 are set so that gaps are formed between the shaft portion 40b of the cushion plunger 40 and the through-hole 41 and the flange portion 40a thereof and the counter-sunk hole 42, respectively. The depth of the counter-sunk hole 42 is set to be larger than the length of the flange portion 40a.

Upon assembling. The cushion ring 30 is inserted onto the ring insertion portion 3a of the piston rod 3A, and the cushion plunger 40 is inserted into the through-hole 41 of the piston 4J until the flange portion 40a of the cushion plunger 40 abuts against a bottom portion 42a of the counter-sunk hole 42 of the piston 4J, and further while this a condition is kept, the piston 4J is fitted onto the end of the ring insertion portion 3a so that the bottom of the recess 21 of the piston 4J is brought into contact with the end surface 23 of the piston rod 3A. In this condition, the bolts 22 are inserted into the bolt holes 25 and threaded holes 24 so that the piston 4J is fixed to the piston rod 3A directly as described above in the first embodiment. At this time, the flange portion 40a of the bottom-side cushion plunger 40 is held between the end surface 23 of the piston rod 3A and the counter-sunk hole 42. When the piston 4J is connected by the bolts 22 in such a manner, both the rod-side cushion ring 30 and the bottom-side cushion plunger 40 can be retained.

As described above, the rod-side cushion ring 30 is formed to provide a floating structure in which the rod-side cushion ring 30 is loosely fitted on the ring insertion portion 3a so as to be movable axially and radially. Further, the bottom-side cushion plunger 40 is also formed to provide a floating structure in which the bottom-side cushion plunger 40 is movable radially and axially, because the shaft portion 40b and the flange portion 4a of the bottom-side cushion plunger 40 are dimensioned to form gaps between the shaft portion 40b and the through-hole 41 and between the flange portion 40a and the counter-sunk hole 42 and the length of the flange portion 40a is smaller than the depth of the counter-sunk hole 42.

When the hydraulic cylinder 1J extends, the rod-side cushion ring 30 enters the cushion hole 6b provided at the inner end portion 6a of the rod-side cylinder head 6 as represented by an imaginary line A in the vicinity of the stroke end, and this restricts the hydraulic fluid passage in the cushion hole 6b to generate a cushioning pressure in the chamber 7a so that the stroke speed is reduced and thus a shock at the stroke end is reduced. At this time, since the cushion ring 30 is movable radially and axially, and thus the cushion ring 30 enters the cushion hole 6b following the shape of the cushion hole 6b while being subjected to centering, there is no fear of biting between the cushion ring 30 and the cushion hole 6b (centering function).

Further, upon entering of the cushion ring 30 into the cushion hole 6b, a cushioning pressure is generated in the chamber 7a and this establishes a pressure difference between the portion of the cushion ring 30 at the side entering the cushion hole 6b and the portion of the cushion ring 30 at the side of the piston 4J (at the side of the chamber 7a) so that the cushion ring 30 is pressed against an end surface of the stepped portion 3b so as to come into tight contact therewith. Accordingly, a hydraulic fluid is prevented from flowing into the supply and discharge port 8 through a gap between the ring insertion portion 3a and an inner circumferential surface of the cushion ring 30. When the piston rod 3A begins to move in a contracting direction (to the right in FIG. 13) after the stroke end is reached and the cushion ring 30 is withdrawn from the cushion hole, a hydraulic fluid from the supply and discharge port 8 flows into the chamber 7a through a gap between an outer circumferential surface of the cushion ring 30 and an inner circumferential surface of the cushion hole 6b. At this time, the cushion ring 30 is pressed against the piston 4J by the hydraulic pressure of the fluid supplied from the supply and discharge port 8. However, since the grooves 30a are provided in the piston side end surface of the cushion ring 30, a hydraulic fluid flows into the gap between the ring insertion portion 3a and the inner circumferential surface of the cushion ring 30 and further flows into the chamber 7a through the grooves 30a. Thus, the cushion ring 30 is satisfactorily withdrawn from the cushion hole 6b (unidirectional flow function).

When the hydraulic cylinder 1 contracts, the bottom-side cushion plunger 40 enters the cushion hole 5c provided in the tube closed end portion 5a of the cylinder body 2 as represented by an imaginary line B in the vicinity of the stroke end, and this restricts the hydraulic fluid passage in the cushion hole 5c to generate a cushioning pressure in the chamber 7b so that the stroke speed is reduced and thus a shock at the stroke end is reduced. At this time, since the cushion plunger 40 is movable radially and thus the cushion plunger 40 enters the cushion hole 5c following the shape of the cushion hole 5c while being subjected to centering, there is no fear of biting between the cushion plunger 40 and the cushion hole 5c (centering function). When the piston rod 3A begins to move in the extending direction (to the left in FIG. 13) after the stroke end is reached and the cushion plunger 40 is withdrawn from the cushion hole 5c, a hydraulic fluid from the supply and discharge port 9 flows into the chamber 7b along the outer circumferential surface of the cushion plunger 40.

In this embodiment, the following advantages are obtained.

First, with respect to the piston connecting structure, the same advantages as described above in the paragraphs 1) to 8) in the first embodiment are obtained. With respect to the advantage described in the paragraph 5), the stepped portion is not completely removed from the piston rod 3A in this embodiment. However, since the small-diameter piston insertion portion in the conventional structure is not required and only the insertion portion 3a for the rod-side cushion ring 30 is provided in the piston rod 3A, it is unnecessary to provide a surplus stepped portion in the piston rod. Accordingly, the problem in damage of the piston rod in the stepped portion is reduced.

With respect to the bottom-side cushioning device, the following advantages are obtained.

1) Since the cushion plunger 40 retained by the piston 4J is provided such that the gaps are formed between the cushion plunger 40 and the through-hole 41 of the piston 4J and between the cushion plunger 40 and the countersunk hole 42 of the piston 4J, and therefore the cushion plunger 40 can move by the gaps. Accordingly, when the bottom-side cushioning device enters the cushion hole, the cushion plunger 40 fulfills a centering function in the same manner as in the conventional ring-like floating type bottom-side cushioning device.

2) In the structure of the conventional floating type bottom-side cushioning device, as shown in FIG. 27, it is necessary to form the ring insertion portion 103h, the threaded hole 103i, etc. on the long piston rod and to retain the cushion ring 140 by an engaging element such as the cushion stopper 150, or the like. Also in the bottom-side cushioning device using the cushion plunger described in JP-U-1-166105, it is necessary to form fine elements such as engaging holes, lateral threaded holes, etc. on an end portion of the long piston rod. In the bottom-side cushioning device according to this embodiment, the structure is such that the cushion plunger 40 is inserted in the piston 4J so that the cushion plunger 40 is retained simultaneously with the fixing of the piston 4J. Accordingly, no processing is necessary for retaining the cushion plunger 40 to the piston rod 3A. Particularly in the conventional bottom-side cushioning device, since the diameter of the ring insertion portion 103h is small, a considerable amount of processing to reduce the piston rod diameter is required for forming the insertion portion 103h, and thus a long time is required for the processing, and it is necessary to form engaging elements such as the threaded hole 103i, etc. is further required. In this embodiment, such processing is not required for the piston rod 3A at all, and the structure for attaching the bottom-side cushioning device is simplified, so that the processability and productivity of the piston rod 3A are improved. Furthermore, when troubles such as wearing, damage, or the like, occurs in the cushioning device, the cushion plunger 40 is separated from the piston rod 3A so that exchange can be made by small unit-parts. Accordingly, the cushioning device is excellent in maintenance.

3) The piston 4J serves also as an element for retaining the cushion plunger 40, and thus engaging elements such as the cushion stopper 150, etc. are not required so that the number of parts can be reduced.

4) The conventional floating type bottom-side cushioning device shown in FIG. 27 is shaped as a ring (cushion ring), whereas in this embodiment, the cushioning device is shaped not as a ring but as a rod (cushion plunger 40). The cushioning device is provided to restrict a hydraulic fluid passage in the cushion hole to generate a cushioning pressure thereby to reduce a shock. If the gap with respect to the cushion hole is constant, the sectional area of the gap decreases as the diameter of the cushion ring or plunger decreases, and the effect of restricting the hydraulic fluid passage becomes large, so that the cushioning device has an advantage in performance. In the rod-like cushioning device according to this embodiment, diameter reduction which could not be achieved by the conventional cushion ring structure can be achieved, so that the bottom-side cushioning device having high performance is obtained.

5) In the floating type bottom-side cushioning device using the conventional cushion ring shown in FIG. 27, the distribution characteristic of pressure which acts on the cushion ring in the vicinity of the stroke end when the hydraulic cylinder contracts is such that in the outer diameter side of the cushion ring, a pressure distribution including a cushioning pressure and a tank pressure is established because the cushioning pressure and the tank pressure act on the outer diameter side of the cushion ring, whilst in the inner diameter side of the cushion ring, a uniform pressure distribution including a cushioning pressure is established because the tank pressure is substantially sealed. When pressures act on the inner and outer diameter sides of the cushion ring in such a manner, the cushion ring is deformed toward the outer diameter side on the basis of the pressure difference between the inner diameter side and the outer diameter side, so that the annular gap set in the cushion hole is reduced greatly. Accordingly, the cushioning pressure increases, so that a higher pressure than required is generated. As a result, the shock due to the hydraulic pressure is intensified because of the rapid increase of pressure, so that the cushioning performance is worsened. Furthermore, since the cushioning pressure becomes high, the pressure-resistant life of each member located in a portion on which the cushioning pressure act is reduced so that the member is broken in the worst case. In this embodiment, however, the generation of a pressure distribution on the inner diameter side can be avoided because the cushion plunger 40 is shaped as a rod. Accordingly, the change of the annular gap as in the conventional structure does not occur at all, so that the cushioning performance can be always kept stable. Further, in the case of a cushion ring, there is a problem in accuracy of processing because the cushion ring is thin. The cushion plunger 40, however, can be processed accurately because the cushion plunger 40 is shaped as a rod.

Other embodiments of the present invention will be described with reference to FIGS. 15 to 20. In FIGS. 15 to 20, parts equivalent to those shown in FIGS. 1, 8 and 13 are referenced correspondingly.

Figure 15:
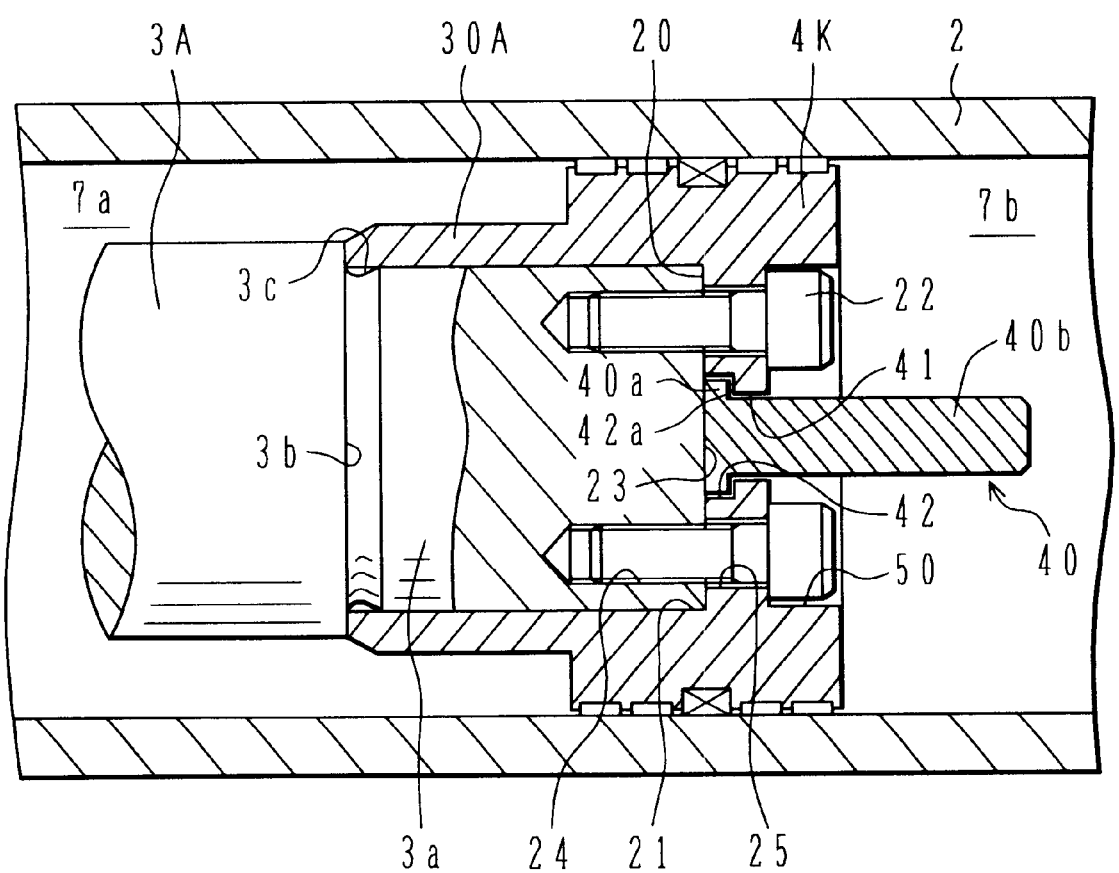
FIG. 15 is a sectional view of a main part of a hydraulic cylinder according to a twelfth embodiment of the present invention.

FIG. 15 shows a twelfth embodiment of the present invention. In FIG. 15, a rod-side cushion ring 30A is constituted as a fixed type cushioning device united with the piston 4k as one body. Further, a recess 50 is provided in the end surface of the piston 4K at the side of the chamber 7*b* thereby to prevent the heads of the bolts 22 from protruding from the end surface of the piston.

Figure 16:
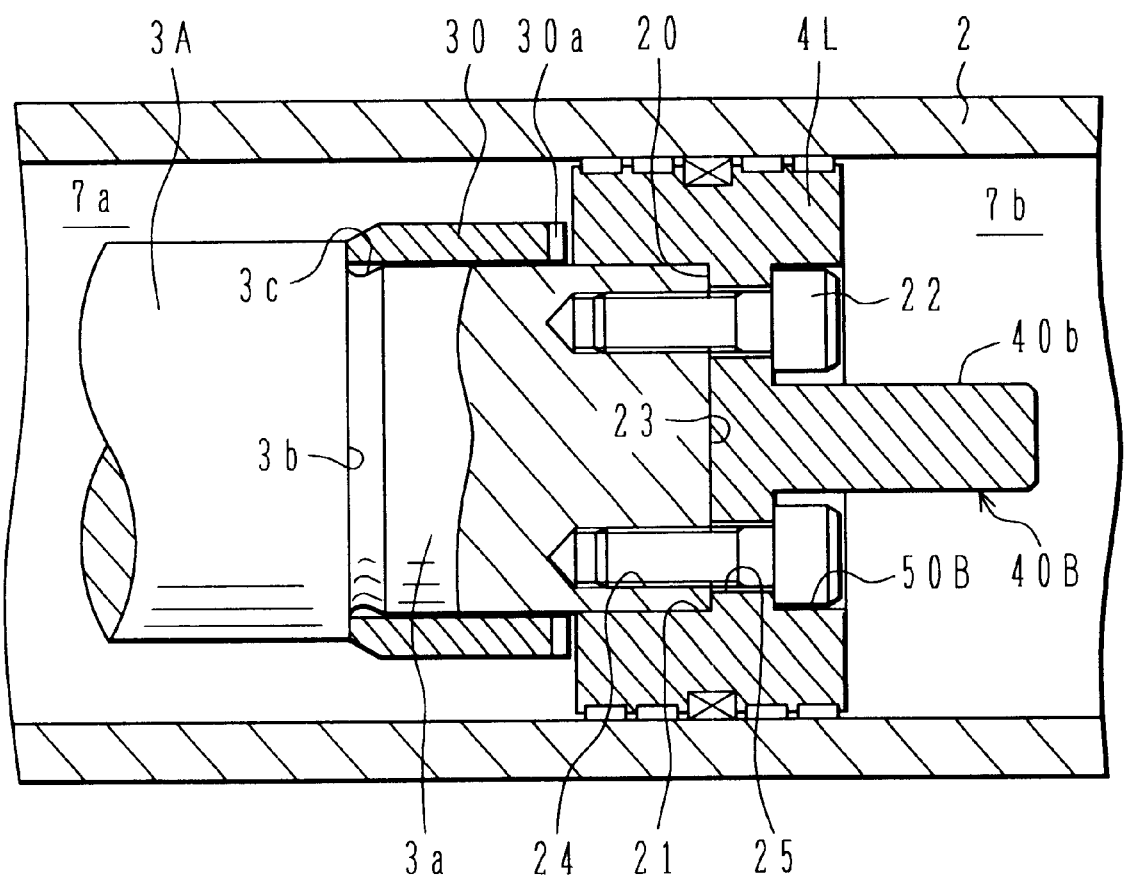
FIG. 16 is a sectional view of a main part of a hydraulic cylinder according to a thirteenth embodiment of the present invention.

FIG. 16 shows a thirteenth embodiment of the present invention. In FIG. 16, a bottom-side cushion plunger 40B is constituted as a fixed type cushioning device united with the piston 4L as one body. Further, counter-sunk holes 50B are provided in the end surface of the piston 4L at the side of the chamber 7*b* thereby to prevent the heads of the bolts 22 from protruding from the end surface of the piston.

Figure 17:
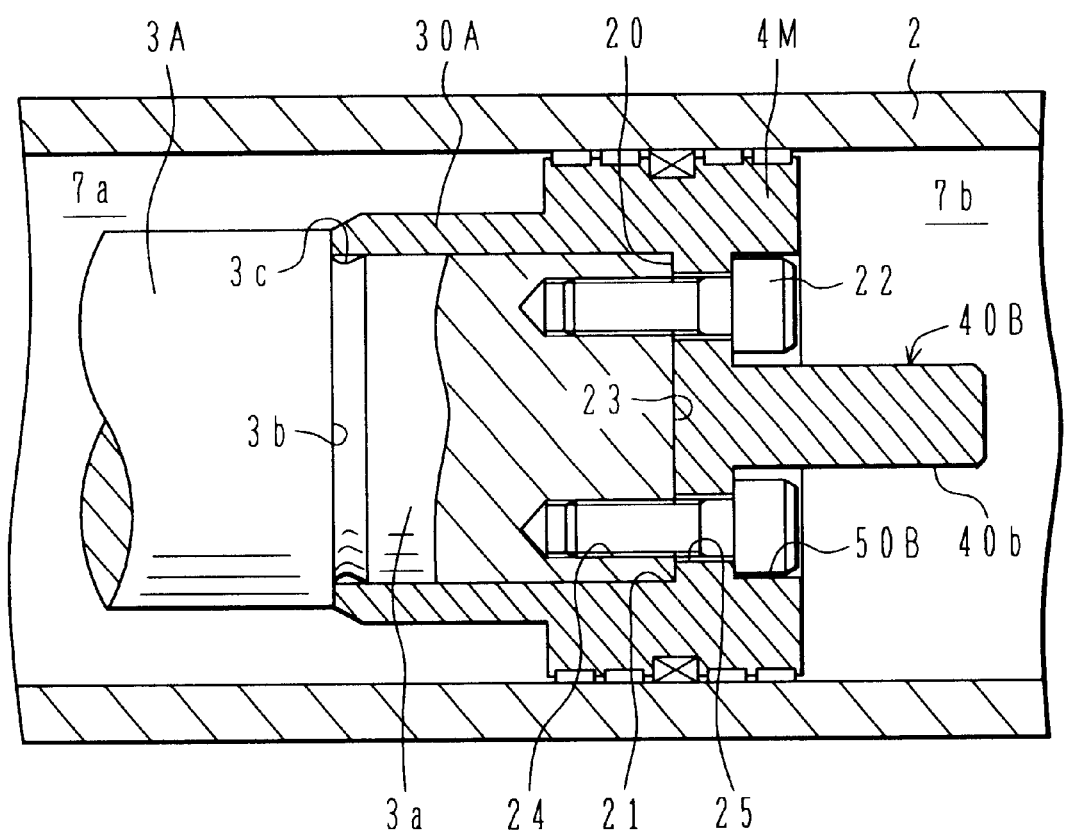
FIG. 17 is a sectional view of a main part of a hydraulic cylinder according to a fourteenth embodiment of the present invention.

FIG. 17 shows a fourteenth embodiment of the present invention. In FIG. 17, both the rod-side cushion ring 30A and the bottom-side cushion plunger 40B are constituted as the fixed type cushioning devices, respectively, united with the piston 4M as one body.

Figure 18:
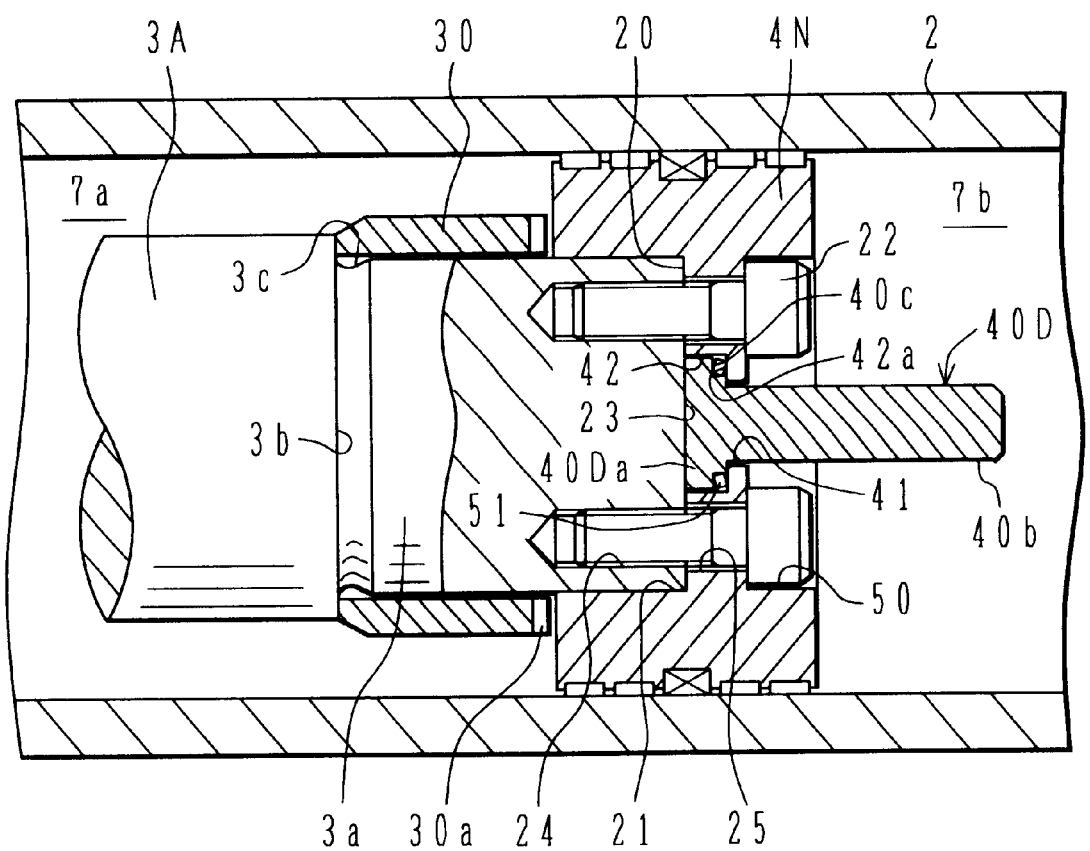
FIG. 18 is a sectional view of a main part of a hydraulic cylinder according to a fifteenth embodiment of the present invention.

FIG. 18 shows a fifteenth embodiment of the present invention. In FIG. 18, a stepped portion 40*c* is provided in a flange portion 40D*a* of the cushion plunger 40D. A coned disc spring 51 is inserted between the stepped portion 40*c* and the bottom portion 42*a* of the counter-sunk hole 42 of the piston 4N thereby to axially urge the flange portion 40D*a* of the cushion plunger 40D between the end surface 23 of the piston rod 3A and the bottom portion 42*a* of the counter-sunk hole. The flange portion 40D*a* of the cushion plunger 40D is retained while being pressed against the end surface 23 of the piston by the action of the coned disc spring 51. In this manner, the axial movement of the cushion plunger 40D is restricted so that the flange portion 40D*a* or the bottom portion 42*a* of the counter-sunk hole 42 is free from wearing.

Even if the axis of the cushion plunger 40D is rendered offset from the axis of the cushion hole 5*c* (see FIG. 13) so that the cushion plunger 40D may interfere with an inlet of the cushion hole 5*c* when the cylinder body 2, the piston rod 3A and the piston 4N are assembled into a hydraulic cylinder, the axis of the cushion plunger 40D is adjusted since the cushion plunger 40D is movable radially, so that the cushion plunger 40D can enter the cushion ring 5*c*. Further, since the cushion plunger 40D is pressed against the end surface 23 of the piston by the coned disc spring 51, the cushion plunger 40D is held in a position where the cushion plunger 40D has been moved after centering. Accordingly, when the cushion plunger 40D enters the cushion hole 5*c* after that, the cushion plunger 40D is prevented from interfering with the cushion hole 5*c*.

Figure 19:
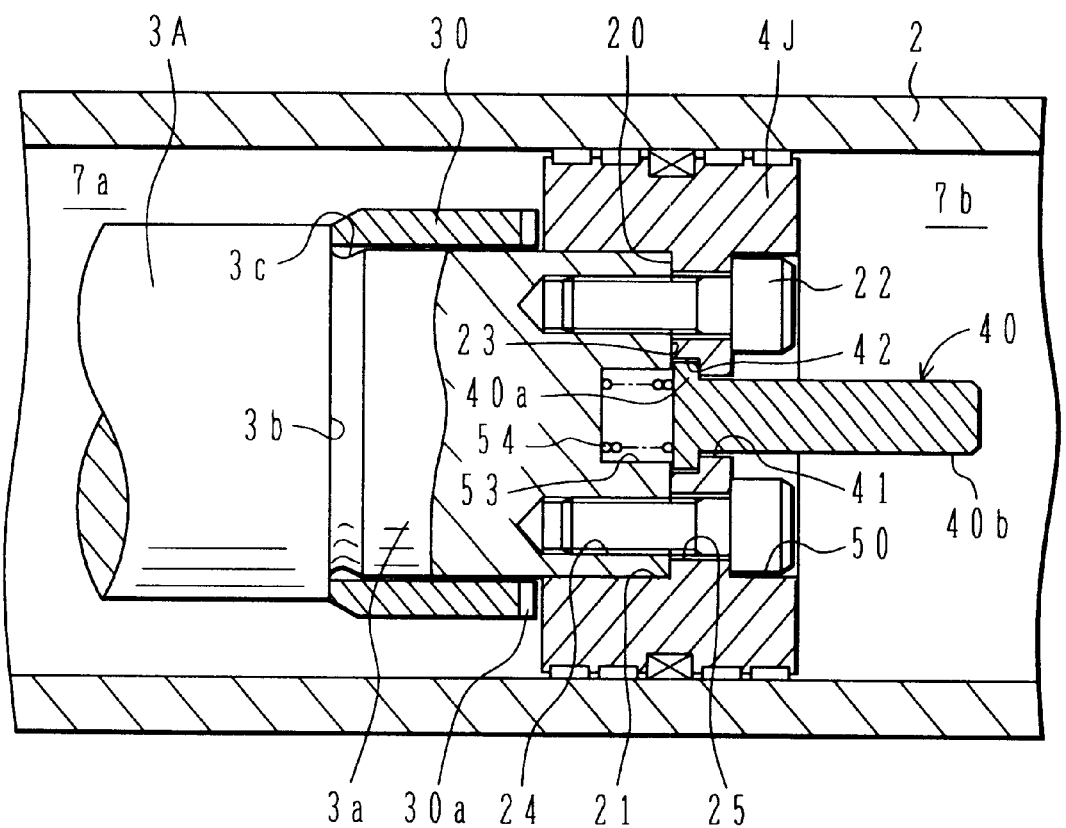
FIG. 19 is a sectional view of a main part of a hydraulic cylinder according to a sixteenth embodiment of the present invention.

FIG. 19 shows a sixteenth embodiment of the present invention. In FIG. 19, a recess 53 is provided in the end surface 23 of the piston rod 3A. A coiled spring 54 is disposed in the recess 53 to retain the flange portion 40*a* of the cushion plunger 40 while being pressed against the bottom portion 42*a* of the counter-sunk hole. The same advantage as that obtained by the coned disc spring 51 in the fifteenth embodiment is obtained by the coiled spring 54.

Figure 20:
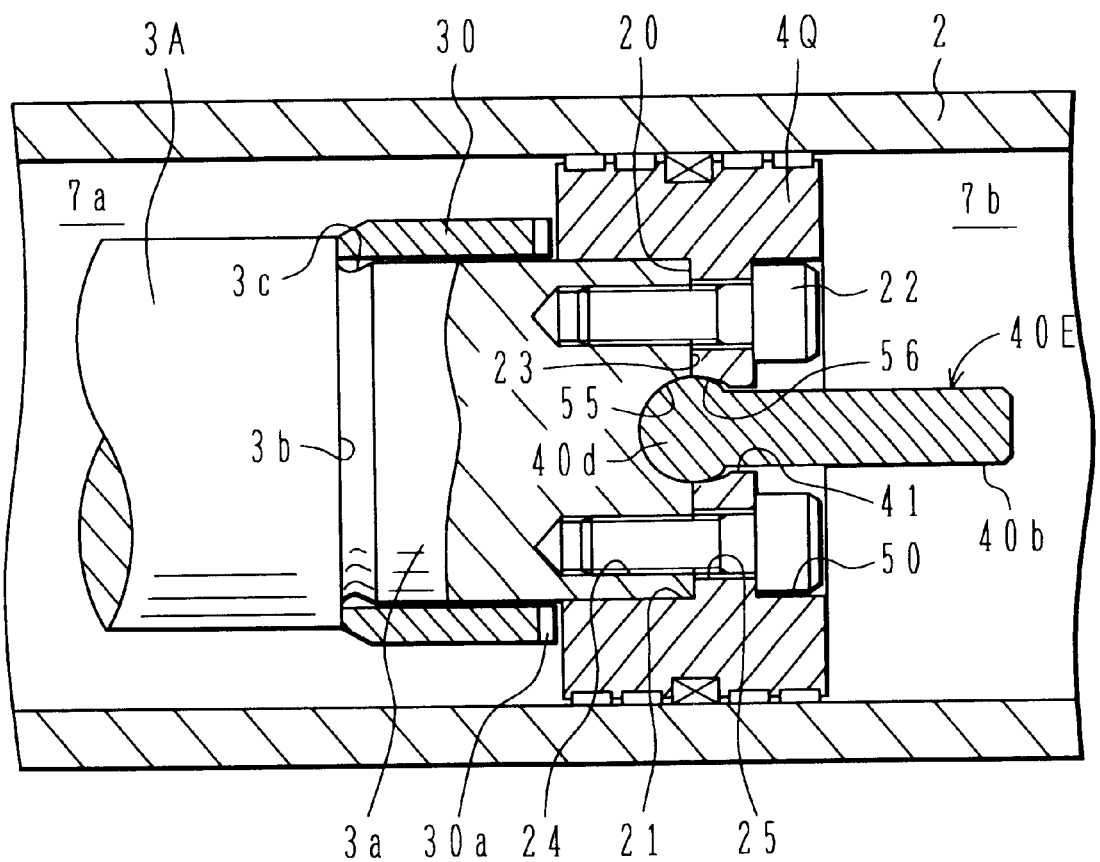
FIG. 20 is a sectional view of a main part of a hydraulic cylinder according to a seventeenth embodiment of the present invention.

FIG. 20 shows a seventeenth embodiment of the present invention. In FIG. 20, a spherical portion 40*d* is provided at a base end of the cushion plunger 40E. Spherical recesses 55 and 56 are provided in the end surface 23 of the piston rod 3A and an end surface (bottom of the recess 21) of a piston 4Q respectively so that the spherical portion 40*d* is received in the spherical recesses 55 and 56 in spherical contact therewith. In this manner, the cushion plunger 40E can tilt by the diameter difference between the through-hole 41 of the piston 4Q and the shaft portion 40*b* of the cushion plunger 40E. Accordingly, when the cushion plunger 40E enters the cushion hole 5*c* (see FIG. 13), the centering function is fulfilled to adjust the angular displacement as well as the parallel displacement between the axis of the cushion plunger 40E and the axis of the cushion hole 5*c*. Further, in the case of the flange portion 40*a* shown in FIG. 13, when the direction of axial force acting on the cushion plunger 40 changes, the flange portion 40*a* moves axially so that a partial wearing may be apt to occur. In this embodiment, however, there is no occurrence of such partial wearing because the cushion plunger 40E comes into spherical contact at the spherical portion 40*d* even when an axially moving force acts on the cushion plunger 40E.

According to the embodiments shown in FIGS. 15 to 20, the advantages as described above in the paragraphs 1) to 8) are also obtained with respect to the piston connecting structure, and according to the embodiments shown in FIG. 15 and FIGS. 18 to 20, the advantages as described above in the paragraphs 1) to 5) are also obtained with respect to the cushioning device.

In the embodiments shown in FIGS. 15 to 17, the cushioning member (such as a cushion ring or cushion plunger) is united with the piston as one body so that the number of parts can be reduced. Particularly in the embodiment shown in FIG. 17, the number of parts can be minimized because both the cushion ring and the cushion plunger are united with the piston as one body.

Further, in the embodiments shown in FIGS. 18 and 19, even if the axis of the cushion plunger is displaced from the axis of the cushion hole upon assembling, the position of the cushion plunger is held once a centering has been made, and therefore the cushion plunger can enter the cushion hole thereafter without further centering action any more.

Further, in the embodiment shown in FIG. 20, the cushion plunger can tilt by the gap between the shaft portion 40*b* of the cushion plunger and the through-hole of the piston, and thus the centering function is fulfilled for the angular displacement between the axis of the cushion plunger 40E and the axis of the cushion hole 5*c*, and further the partial wearing is avoided because of the spherical contact.

Figure 21:
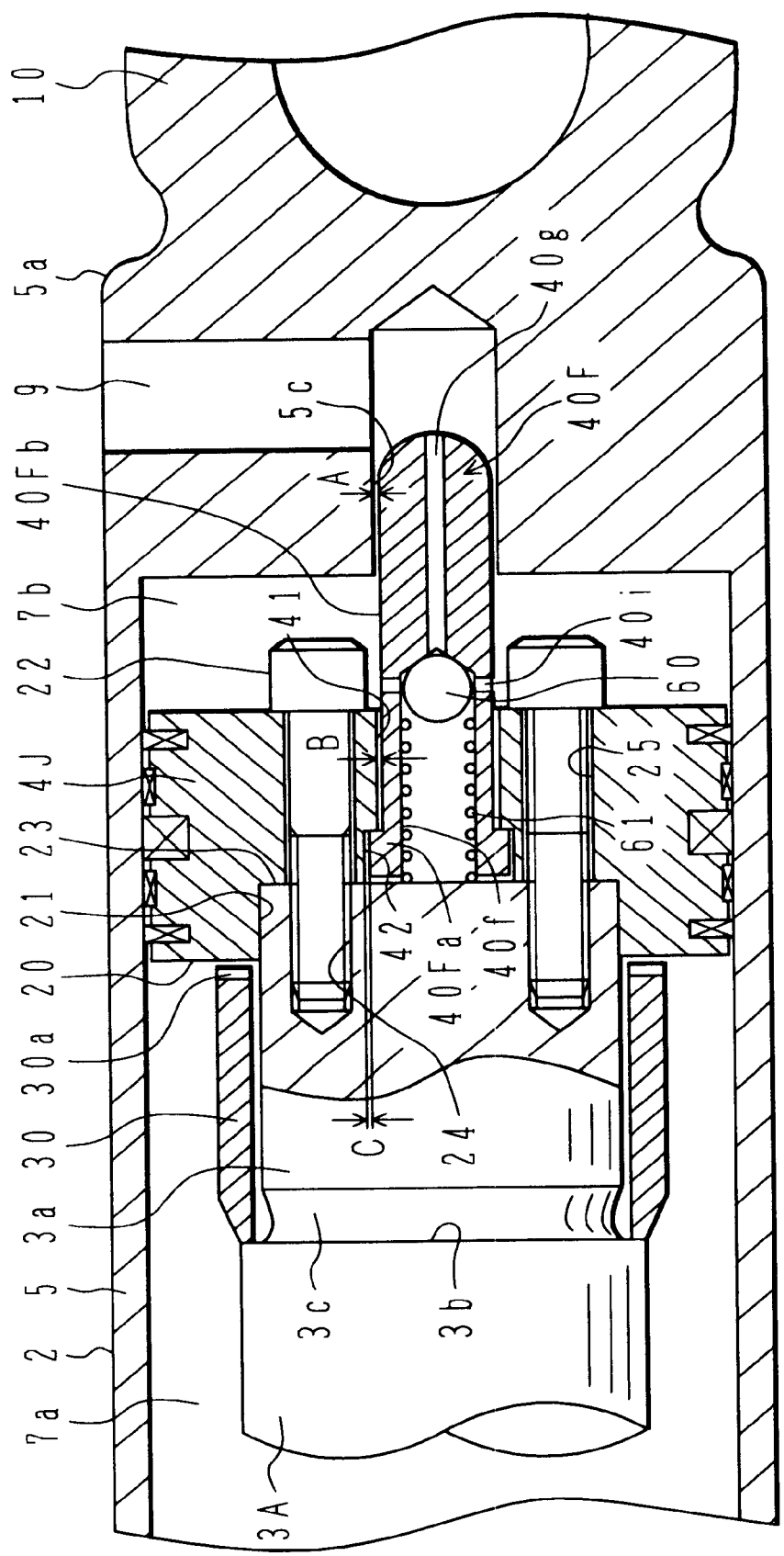
FIG. 21 is a sectional view of a main part of a hydraulic cylinder according to an eighteenth embodiment of the present invention.

An eighteenth embodiment of the present invention will be described with reference to FIG. 21. In this embodiment, both the centering function and the unidirectional flow function are given to the cushion plunger. In FIG. 21, parts equivalent to those shown in FIGS. 1, 8 and 13 are referenced correspondingly.

In FIG. 21, a bottom-side cushioning device in this embodiment has a cushion plunger 40F having a flange portion 40F*a* at its base end, and a shaft portion 40F*b* having a spherical surface at its front end. Like the aforementioned embodiments, the shaft portion 40F*b* is loosely inserted in the through-hole 41 of the piston 4J with a radial gap, and the flange portion 40F*a* is loosely fitted between the end surface of the piston rod 3A (the end surface of the ring insertion portion 3*a*) and the counter-sunk hole 42 with radial and axial gaps.

Further, an inner diameter hole 40f having a bottom portion in a tapered shaped is formed in the end surface of the cushion plunger 40F at the side of the flange portion 40F*a*. Small holes 40*g*, 40*i* are formed in the shaft portion 40F*b*. The small hole 40*g* is formed to open at the spherical front end surface and extends in the shaft portion 40F*b* axially into the inner diameter hole 40*f*. The small holes 40*i* are formed radially to communicate the inner diameter hole 40*f* to the bottom-side chamber 7*b*. A ball 60 and a spring 61 are disposed in the inner diameter hole 40*f*. The ball 60 is arranged in contact with the tapered surface of the bottom portion of the inner diameter hole 40*f* to open/close the opening portion of the small hole 40*g*. The spring 61 is supported by the end surface 23 of the piston rod 3A to urge the ball 60 in the direction in which the ball 60 is brought into contact with the tapered surface of the bottom portion of the inner diameter hole 40f (that is, in the direction closing the opening portion of the small hole 40g).

As shown in FIG. 21, denoting as A the annular gap between the cushion hole 5c and the shaft portion 40Fb of the cushion plunger 40F, as B the annular gap between the through-hole 41 of the piston 4J and the shaft portion 40Fb of the cushion plunger 40F, and as C the annular gap between the counter-sunk hole 42 of the piston 4J and the flange portion 40Fa of the cushion plunger 40F, respectively, the relation in size is established as A<B<C or A<C<B. Accordingly, the shaft portion 40Fb of the cushion plunger can move radially freely by the annular gap A, so that the flow sectional area of the restricted flow passage upon carrying out the cushioning operation is determined by the annular gap A. Accordingly, the cushioning operation can be fulfilled more effectively by setting the annular gap A to be as small as possible.

The ball 60 and the spring 61 constitute a check valve means. The ball 60, the spring 61, the small holes 40g and 40i and the inner diameter hole 40f fulfill a unidirectional flow function to prevent a hydraulic fluid from flowing from the bottom-side chamber 7b into the supply and discharge port 9 when the cushion plunger 40F enters the cushion hole 5c while allowing a hydraulic fluid to flow from the supply and discharge port 9 into the bottom-side chamber 7b when the cushion plunger 40F is withdrawn from the cushion hole 5c.

With the aforementioned configuration, the cushioning operation can be fulfilled in the vicinity of the stroke end when the hydraulic cylinder contracts. That is, the cushion plunger 40F is loosely fitted to the piston 4J in the beginning of the operation. Accordingly, when the piston rod 3A begins to move to contract, the axis of the cushion plunger 40F is displaced from the axis of the piston 4J as far as the cushion plunger 40F is not particularly restrained. However, when the vicinity of the stroke end is reached and the cushion plunger 40F is moved to a position to face the cushion hole 5c, the spherical surface portion of the end of the cushion plunger 40F abuts the cushion hole 5c and is displaced following the cushion hole 5c. When the cushion plunger 40F further enters the cushion hole 5c, the axis of the cushion plunger 40F is brought into alignment with the axis of the cushion hole 5c (centering function). At the same time, the ball 60 disposed in the inner diameter hole 40f of the cushion plunger 40F blocks the opening portion of the small hole 40g by the action of the spring 61 (unidirectional flow function). As a result, the bottom-side chamber 7b communicates with the supply and discharge port 9 only through the annular gap A between the wall portion of the cushion hole 5c and the cushion plunger 40F, so that the flow passage is restricted. Accordingly, a back pressure is generated in the bottom-side chamber 7b, so that the cushioning operation is fulfilled. Further, as the cushion plunger 40F enters the cushion hole 5c, the annular restricted flow passage becomes longer and the flow resistance becomes larger, and therefore a greater cushioning operation is fulfilled, so that the piston rod 3A stops at the stroke end smoothly and softly and a shock at the time of stopping of the cushion plunger 40F is reduced.

When a hydraulic fluid is supplied into the supply and discharge port 9 in the state of the hydraulic cylinder contracting at maximum to extend the piston rod 3A, the bottom-side chamber 7b is to be enlarged, and therefore the ball 60 in the inner diameter hole 40f of the cushion plunger 40F moves axially against the force of the spring 61 by the pressure difference between the supply and discharge port 9 and the chamber 7b, so that the ball 60 is separated from the tapered surface of the bottom portion of the inner diameter hole 40f. As a result, a flow passage of a hydraulic fluid from the small hole 40g of the cushion plunger 40F through the inner diameter hole 40f to the small holes 40i is formed in addition to the annular flow passage between the shaft portion 40Fb of the cushion plunger 40F and the wall portion of the cushion hole 5c (unidirectional flow function). Accordingly, the flow sectional area becomes considerably large compared with the case where the hydraulic cylinder contracts. Accordingly, the piton rod 3A extends smoothly, so that there is no fear of generation of noise, when the cushion plunger 40F is withdrawn from the cushion hole 5c.

As described above, the flow passage from the small hole 40g of the cushion plunger 40F through the inner diameter hole 40f to the small holes serves as a unidirectional flow passage closed by the ball 60 when the piston rod 3A moves to contract but opened when the piston rod 3A moves to extend, and therefore the flow passage can be considerably restricted when the piston rod 3A moves to contract but can be enlarged when the piston rod 3A moves to extend (unidirectional flow function).

Further, the centering function of the cushion plunger 40F with respect to the cushion hole 5c is such that once the cushion plunger 40F has been fitted into the cushion hole 5c, the centering is maintained because the cushion plunger 40F is held by the contacting pressure between the flange portion 40Fa of the cushion plunger 40F and the wall portion of the counter-sunk hole 42 of the piston 4J by the action of the force of the spring 61 the very moment the cushion plunger 40F has been withdrawn from the cushion hole 5c (centering keeping function).

Accordingly, there may be a fear that the cushion plunger 40F comes into frictional contact with the wall portion of the cushion hole 5c initially, however, there is no fear of wearing, or the like, on the long term base because the cushion plunger 40F has a function of learning the centering described above.

Accordingly, in this embodiment, the advantages as described above in the paragraphs 1) to 8) are also obtained with respect to the piston connecting structure, and the advantages as described above in the paragraphs 1) to 5) are also obtained with respect to the bottom-side cushioning device. Further, the same centering keeping function of the bottom-side cushioning device as in the embodiments shown in FIGS. 18 and 19 is also obtained in this embodiment. Further, a performance at the time of withdrawing of the cushion plunger 40F from the cushion hole 5c can be improved by the unidirectional flow function provided by the small holes 40g and 40i, the inner diameter hole 40f, the ball 60 and the spring 61.

Figure 22:
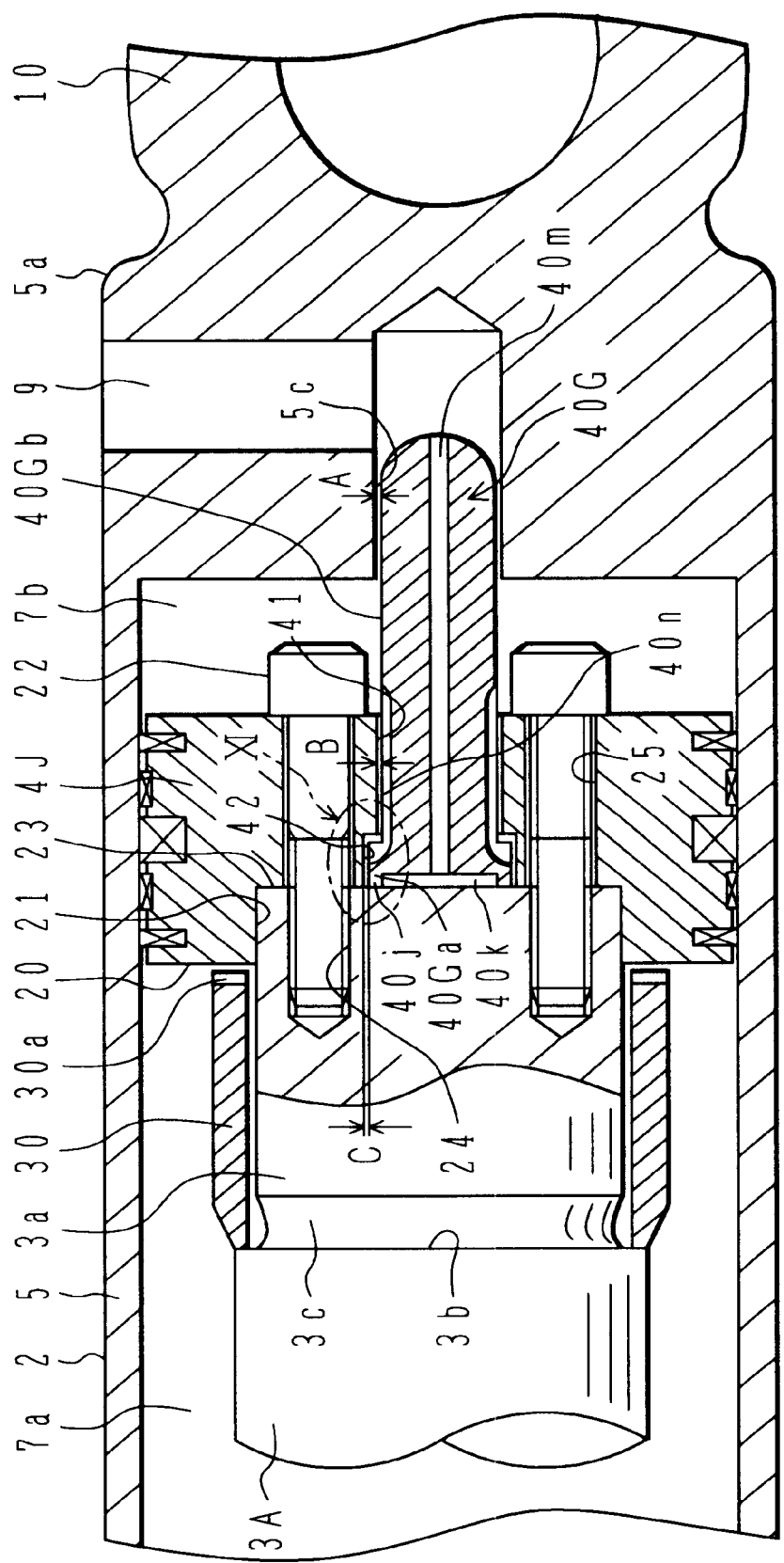
FIG. 22 is a sectional view of a main part of a hydraulic cylinder according to a nineteenth embodiment of the present invention.
Figure 23:
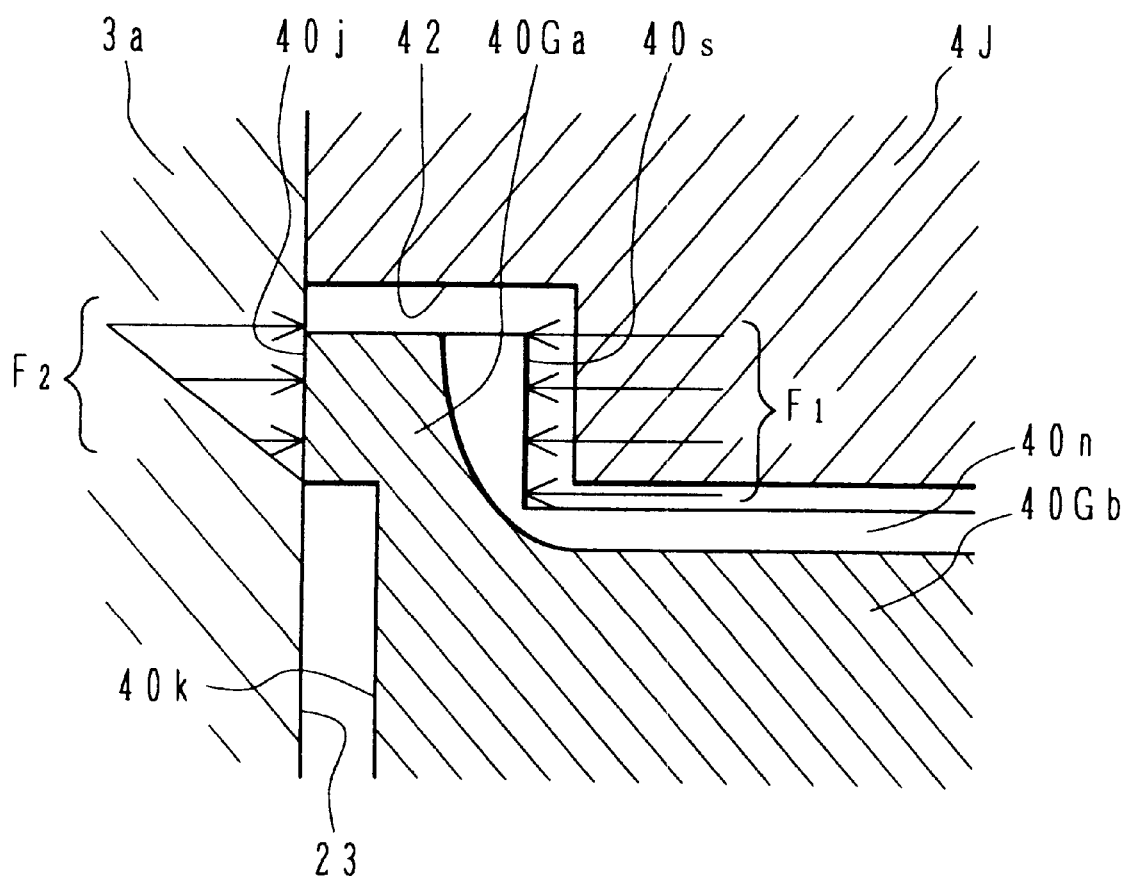
FIG. 23 is an enlarged view of a main part XI of the hydraulic cylinder depicted in FIG. 22.

A nineteenth embodiment of the present invention will be described below with reference to FIGS. 22 and 23. In this embodiment, instead of the ball and the spring, a hydraulic balance is used for forming the check valve means to provide a unidirectional flow function. In FIGS. 22 and 23, parts equivalent to those shown in FIGS. 1, 8, 13 and 21 are referenced correspondingly.

In FIG. 22, a bottom-side cushioning device in this embodiment has a cushion plunger 40G having a flange portion 40Ga at its base end, and a shaft portion 40Gb having a spherical surface at its front end. Like the aforementioned embodiments, the shaft portion 40Gb is loosely inserted in the through-hole 41 of the piston 4J with a radial gap, and the flange portion 40Ga is loosely fitted between the end surface of the piston rod 3A (the end surface of the ring insertion portion 3a) and the counter-sunk hole 42 with radial and axial gaps.

Further, an inner diameter recess 40k is formed in the end surface of the cushion plunger 40G at the side of the flange portion 40Ga with an outer circumferential end surface portion 40j being left. A small hole 40m is formed in the shaft portion 40Gb to open at the spherical front end surface of the shaft portion 40Gb and extend in the shaft portion 40Gb axially into the inner diameter recess 40k. Further, a long groove 40n is formed in the outer circumferential portion of the cushion plunger 40G so as to extend from a portion in the bottom-side chamber 7b to the flange portion 40Ga, so that the radial gap between the flange portion 40Ga and the wall portion of the counter-sunk hole 42 communicates with the bottom-side chamber 7b through the long groove 40n.

Further, the inner diameter recess 40k is dimensioned such that an axial hydraulic pressure F1 acting on the radial stepped surface 40s of the flange portion 40Ga at the side of the shaft portion 40Gb is larger than an axial hydraulic pressure F2 acting on the outer circumferential end surface portion 40j of the flange portion 40Ga when the cushion plunger 40G enters the cushion hole 5c. The outer circumferential end surface portion 40j of the cushion plunger 40G constitutes a check valve means in combination with the radial stepped surface 40s of the flange portion 40Ga at the side of the shaft portion 40Gb and an end surface portion of the piston rod 3A in contact with the outer circumferential end surface portion 40j.

That is, assuming that FIG. 22 shows a state in which the cushion plunger 40G enters the cushion hole 5c, as shown enlargedly in FIG. 23, a cushioning pressure acts on the whole of the radial stepped surface of the flange portion 40Ga at the side of the shaft portion 40Gb in this state whereas a distributed pressure varying from the cushioning pressure to a tank pressure acts on the outer circumferential end surface portion 40j which is a contact surface, except the inner diameter recess 40k, between the end surface of the cushion plunger 40G and the end surface of the piston rod 3A. Now, the products of the pressure distributions and the pressurized area are the aforementioned hydraulic pressures F1 and F2 respectively, and the size of the inner diameter recess 40k is set to satisfy the relation F1>F2 as described above, and therefore a sealing is secured at the contacting end surfaces. Accordingly, the flow passage from the bottom-side chamber 7b as a cushion chamber to the supply and discharge port 9 is constituted only by the annular gap between the cushion plunger 40G and the wall portion of the cushion hole 5c, so that cushioning performance can be fulfilled.

On the other hand, when the hydraulic cylinder extends, a hydraulic fluid enters from the supply and discharge port 9 into the inner diameter recess 40k through the small hole 40m, and the pressure of the bottom-side chamber 7b becomes low and therefore the aforementioned pressure distributions are reversed. Accordingly, the cushion plunger 40G moves to the right in FIG. 22, so that the hydraulic fluid in the inner diameter recess 40k further enters the bottom-side chamber 7b through the long groove 40n to accelerate the extending speed of the piston rod 3A.

Accordingly, compared with the eighteenth embodiment shown in FIG. 21, all functions but the centering keeping function for the cushion plunger are provided in this embodiment. Further, a hydraulic pressure balance is utilized for providing a check valve function, and therefore the number of parts can be reduced, so that there is an advantage that an excellent productivity and a high reliability are achieved.

Figure 24:
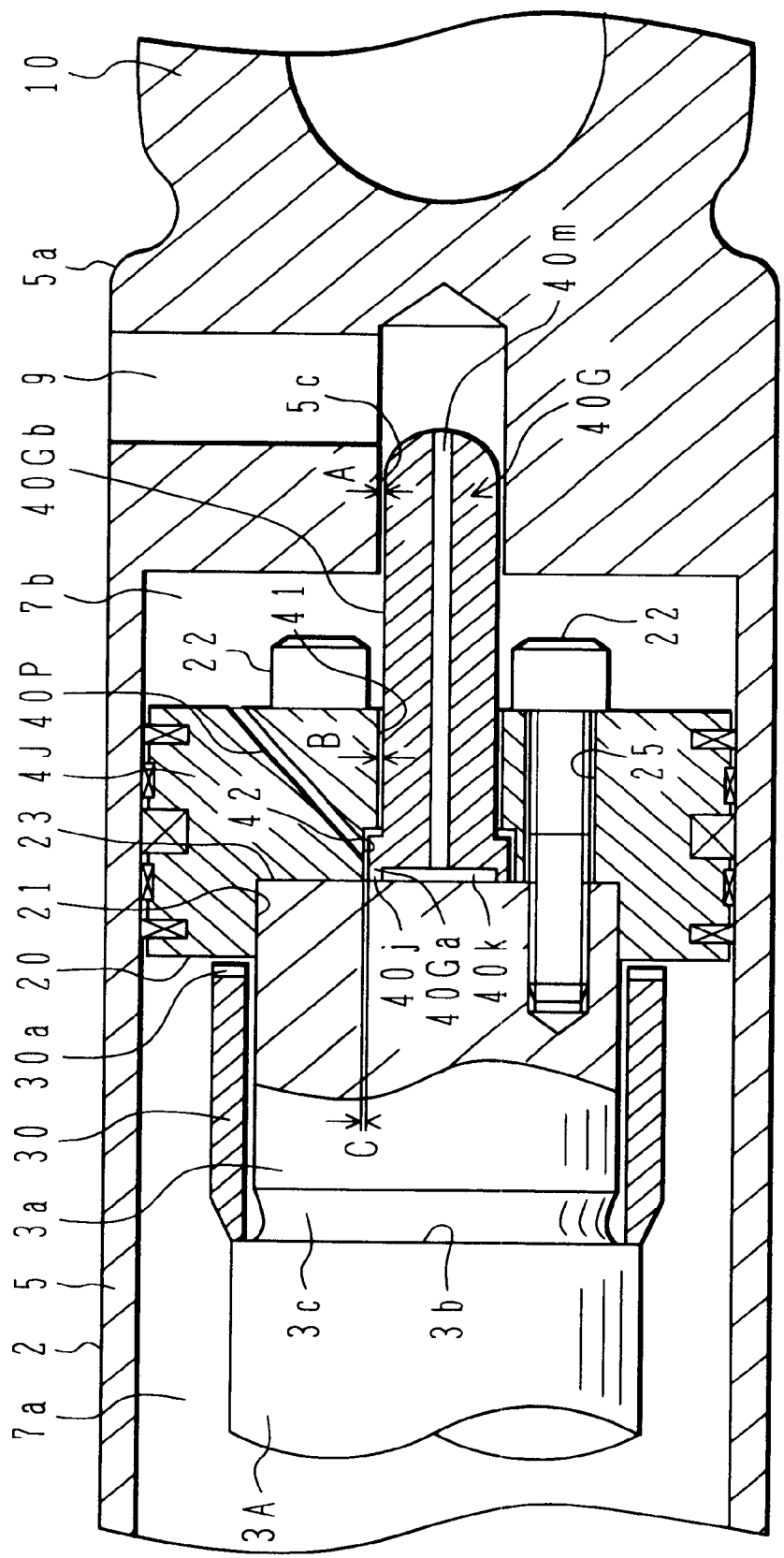
FIG. 24 is a sectional view of a main part of a like hydraulic cylinder showing a modified example of the embodiment depicted in FIG. 22.

FIG. 24 shows a modified form of the nineteenth embodiment shown in FIG. 22. In the nineteenth embodiment, the long groove 40n is formed in the outer circumferential portion of the cushion plunger 40G as a passage to communicate the radial gap between the flange portion 40Ga and the wall portion of the counter-sunk hole 42 to the bottom-side chamber 7b. As shown in FIG. 24, a small hole 40p may be formed in the piston 4J to communicate the radial gap between the flange portion 40Ga and the wall portion of the counter-sunk hole 42 to the bottom-side chamber 7b, and with such a structure, the unidirectional flow function can be attained in combination with the small hole 40m and the outer circumferential end surface portion 40j of the cushion plunger 40G.

Figure 25A:
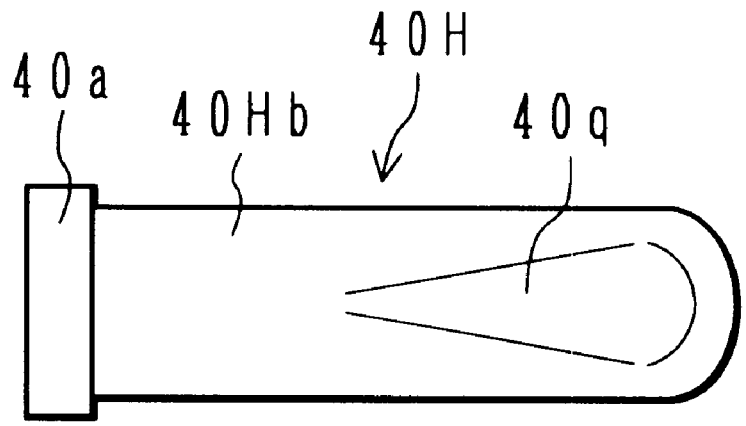
FIGS. 25A and 25B are external appearance views of a cushion plunger used in a hydraulic cylinder according to a twentieth embodiment of the present invention.
Figure 25B:
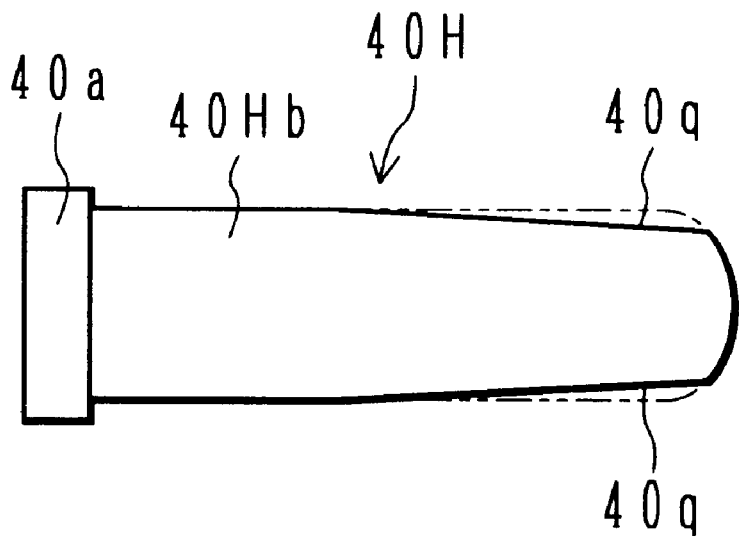

A twentieth embodiment of the present invention will be described below with reference to FIG. 25. In this embodiment, inclined grooves 40q widened toward the front end of the cushion plunger 40H are formed in the outer circumferential portion of the shaft portion 40Hb of the cushion plunger 40H, and the structure other than this configuration is the same as the embodiments shown in FIGS. 1, 8, 13, 21, etc.

In the embodiments shown in FIGS. 13, 21, etc., the restricted opening area characteristic is determined by the constant annular gap formed between the cushion plunger and the cushion hole 5c and the fitting length of the cushion plunger which changes in accordance with the stroke at the time of contraction. By additionally forming the inclined grooves 40q, the broader restricted opening area characteristic can be set, and thus the cushioning characteristic can be adjusted. Particularly, a change in the restricted opening area in the initial stage when the cushion plunger enters the cushion hole 5c can be reduced, so that there is an advantage that the cushioning performance in the initial stage of entering of the plunger into the cushion hole 5c is improved.

Figure 26:
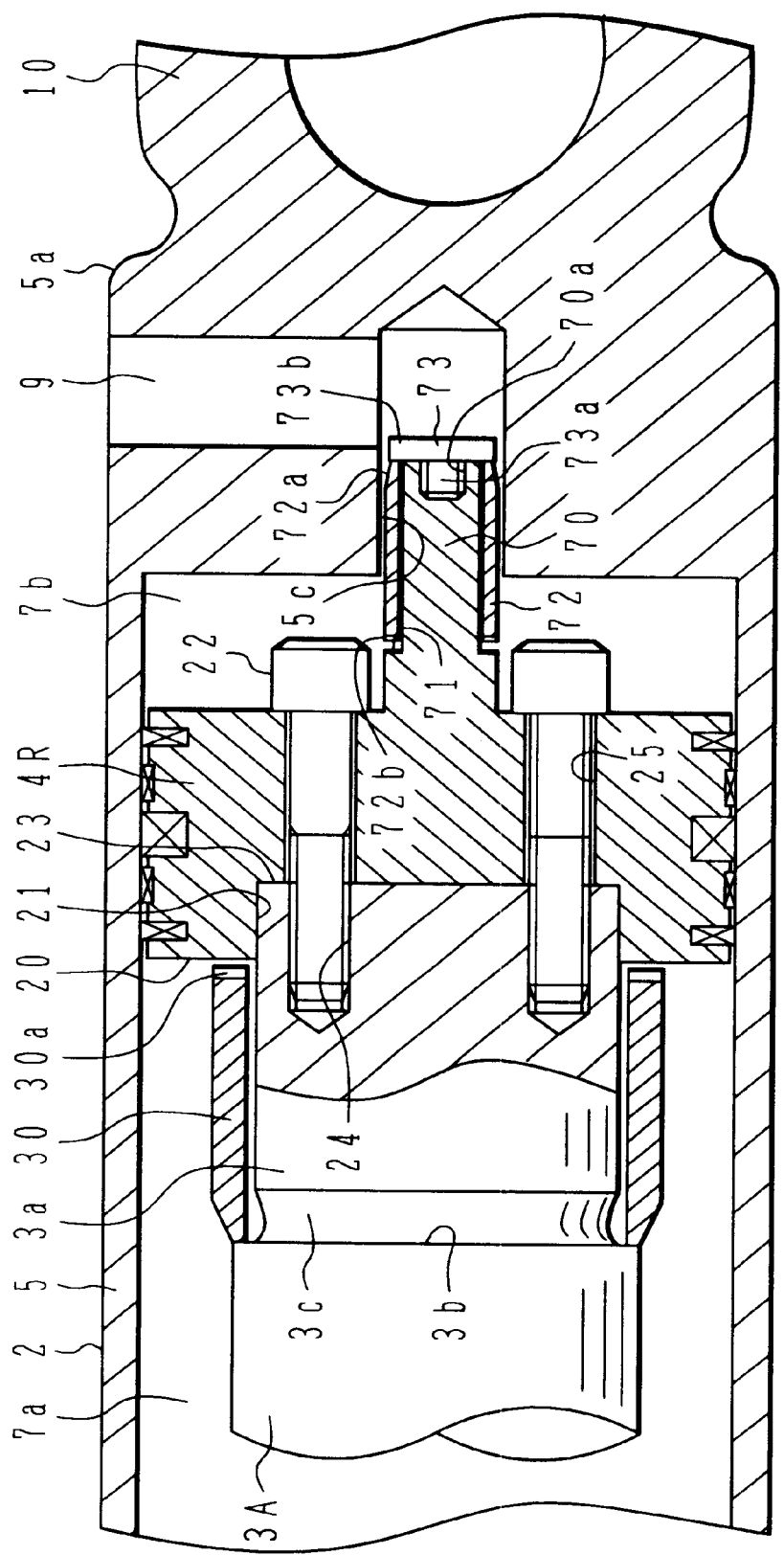
FIG. 26 is a sectional view of a main part of a hydraulic cylinder according to a twenty-first embodiment of the present invention.

A twenty-first embodiment of the present invention will be described below with reference to FIG. 26. In this embodiment, a cushion ring is used as the bottom-side cushioning device. In FIG. 26, parts equivalent to those shown in FIGS. 1, 8, 13 and 21 are referenced correspondingly.

In FIG. 26, a bottom-side cushioning device in this embodiment has a shaft portion 70, a floating type cushion ring 72, and a stopper plug 73. The shaft portion 70 protrudes from the bottom-side end surface of the piston 4I and has a stepped surface 71 on the piston body side. The cushion ring 72 is loosely fitted on the shaft portion 70 so as to be movable radially and axially. The stopper plug 73 is provided at an end of the shaft portion 70. The stopper plug 73 is constituted by a male screw portion 73a and a flange portion 73b, and the male screw portion 73a is threadedly with a threaded hole 70a formed in a front end surface of the shaft portion 70. A tapered guide surface 72a is formed at a front end portion of the cushion ring 72. Grooves 72b are formed at a rear end portion of the cushion ring 72, that is, at the step surface 71 side end portion of the cushion ring 72.

The cushioning operation of the cushion ring 72 is the same as that of the cushioning device using the conventional floating type cushion ring shown in FIG. 27. That is, when the hydraulic cylinder contracts and the cushion ring 72 enters the cushion hole 5c in the vicinity of the stroke end, the cushion ring 72 follows the shape of the cushion hole 5c (centering function) and further also the front end surface of the cushion ring 72 is brought into tight contact with the flange portion 73b of the stopper plug 73 by the pressure in the bottom-side chamber 7b thereby to close the flow passage constituted by the annular gap between the shaft portion 70 and the cushion ring 72 (unidirectional flow function), so that the stroke speed is reduced by the restricted flow passage between the cushion ring 72 and the cushion hole 5c so that a shock at the stroke end is reduced. When the hydraulic cylinder extends from the stroke end position, although the rear end surface of the cushion ring 72 is brought into tight contact with the step surface 71 by the pressure of the hydraulic fluid supplied from the supply and discharge port 9, the grooves 72b establish a flow passage by the annular gap between the shaft portion 70 and the cushion ring 72 (unidirectional flow function), and therefore, the cushion ring 72 is satisfactorily withdrawn from the cushion hole 5c.

Accordingly, also in this embodiment, with respect to the bottom-side cushioning device, the same performance as that in the aforementioned embodiments using the cushion plunger is obtained.

Further, also in this embodiment, an excellent maintenance characteristic is secured since exchange can be made by small-unit parts when wearing, damage, or the like, is generated between the inner diameter portion of the cushion ring 72 and the shaft portion 70.

Incidentally, in the embodiments shown in FIGS. 21 to 25, the centering function and the unidirectional flow function are provided to the bottom-side cushioning device using the cushion plunger in the embodiment shown in FIG. 13. However, the embodiments shown in FIGS. 15 to 20 may be suitably combined with the embodiments shown in FIGS. 21 to 25 so that the centering function and the unidirectional flow function are provided to the bottom-side cushioning device. For example, the piston connecting structure in the embodiment shown in FIG. 15 may be combined with the plunger type bottom-side cushioning device having the centering function and the unidirectional flow function shown in FIGS. 21 to 25. The resilient means shown in FIG. 18 or 19 may be provided in the flange portion of the cushion plunger having the hydraulic pressure balance structure shown in FIGS. 22 and 23 to provide the centering keeping function. In any one of the embodiments shown in FIGS. 15 to 20, the inclined grooves shown in FIG. 25 may be provided in the cushion plunger so that the same advantage can be obtained. Further, the cushion ring type bottom-side cushioning device shown in FIG. 26 may be employed in any one of the embodiments shown in FIGS. 15 to 20.

INDUSTRIAL USABILITY

According to the present invention, the following advantages are obtained with respect to the piston connecting structure.

1) Since it is unnecessary to provide any male screw portion in the piston rod, it is unnecessary not only to use any high-strength material for the piston rod but also to provide any heat treatment to improve the strength, and therefore, the piston rod can be produced using an inexpensive material at a low cost.
2) Since the strength of the bolt is large even if the bolt is formed of a usual material, and it is easy to form the bolt using a stronger material, the strength of the piston connecting portion can be improved with a simple structure, so that the life of the piston rod can be improved.
3) Fatigue strength against external force is also improved since the piston is fixed by the bolt.
4) The piston connecting structure can be constituted by the minimum number of parts because parts other than the bolt are not required.
5) Since the conventional piston insertion portion is not required, it is not necessary to provide a surplus stepped portion in the piston rod, and therefore the problem of damage at the stepped portion is reduced.
6) The total length of the rod is determined by a length up to the head of the bolt, and therefore the effective stroke of the hydraulic cylinder can be elongated.
7) When a plurality of bolts are used, torque for tightening each bolt can be reduced, therefore it is easy to assemble and disassemble the piston connecting structure.
8) When a plurality of bolts are used, since a torque for tightening each bolt is small, the bolts can be loosened manually without use of such a large-scale exclusive machine as required conventionally, and therefore a serviceability is improved.

Further, according to the present invention, the following advantages are obtained with respect to the structure of the bottom-side cushioning device.

1) Since the bottom-side cushioning device is provided so as to protrude from the bottom-side end surface of the piston, it is unnecessary to apply a complex processing to the end of the piston rod, and therefore the piston rod can be processed easily.
2) Since the bottom-side cushioning device is provided with a centering function, the cushioning device enters the cushion hole smoothly following the shape of the cushion hole, and therefore there is no fear of biting between the cushioning device and the cushion hole.
3) Since the bottom-side cushioning device is provided with a unidirectional flow function in addition to the centering function, a satisfactory performance of withdrawing from the cushion hole is secured.
4) Since a cushion plunger is used as the bottom-side cushioning device, the problem in swelling of the cushion device due to the difference between pressure distributions in inner and outer circumferential surfaces as in the cushion ring is avoided, and therefore a stable cushioning performance can be always secured.
5) Since the cushion plunger is attached by retaining it with the enlarged base end portion simultaneously when the piston is fixed to the piston rod by bolt, the necessity of applying processing to the piston rod for attaching the cushion plunger is eliminated or minimized, and therefore it is easy to process the piston rod. Further, since the piston serves also as an element for retaining the cushion plunger, the number of parts can be reduced. Further, by attaching the cushion plunger so as to be able to radially move or tilt, the centering function is fulfilled when the cushion plunger enters the cushion hole in the same manner as in the conventional ring floating type bottom-side cushioning device.
6) Since the through-hole and the counter-sunk hole provided in the piston are dimensioned in such a manner to provide gaps between the through-hole and the shaft portion of the cushion plunger and between the counter-sunk hole and the flange portion of the cushion plunger, respectively, thereby to allow the cushion plunger to move radially, the cushion plunger can be attached simultaneously with the fixing of the piston to the piston rod by bolt whilst the cushion plunger can move radially.
7) Since the axial movement of the radially movable cushion plunger is restricted resiliently, even if the axis of the cushion plunger is displaced from the axis of the cushion hole, the position of the cushion plunger is held once a centering has been made, and therefore the cushion plunger can enter the cushion hole thereafter without further centering any more.
8) Since the rod-side cushion plunger can tilt, the centering function is fulfilled for the angular displacement between the axis of the cushion plunger and the axis of the cushion hole, and further, a partial wearing is avoided because of the spherical contact.

9) Since the cushion plunger is of a fixed type in which the cushion plunger is united with the piston as one body, the number of parts can be reduced.

10) Since the bottom-side cushioning device uses a cushion plunger to provide the centering function as well as the unidirectional flow function, the device can enter the cushion hole smoothly following the shape of the cushion hole, and a satisfactory performance of withdrawing from the cushion hole is secured. Further, the problem in swelling of the cushion device due to the difference between pressure distributions in inner and outer circumferential surfaces as in the cushion ring is avoided and therefore a stable cushioning performance can be always secured.

11) Since the check valve means is constituted by a ball and a spring to provide the unidirectional flow function in which the spring urges the cushion plunger through the ball, the centering of the cushion plunger is maintained once the cushion plunger has been brought into an axial alignment with the cushion hole.

12) Since the check valve means is constituted by utilizing a hydraulic pressure balance to provide the unidirectional flow function, the number of parts can be reduced, so that an excellent productivity and a high reliability are obtained.

13) Since the inclined grooves are formed on the cushion plunger, the cushioning characteristic can be adjusted, and in particular a change in the restricted opening area in the initial stage when the cushion plunger enters the cushion hole can be reduced, so that the cushioning performance in the initial stage of entering is improved.

14) Since the bottom-side cushioning device uses a cushion ring to provide the centering function as well as the unidirectional flow function, the device can enter the cushion hole smoothly following the shape of the cushion hole, and a satisfactory performance of withdrawing from the cushion hole is secured.

15) Since the rod-side cushioning device having a floating type cushion ring is further provided, a shock at the stroke end upon extending the piston rod is reduced, and the centering function as well as the unidirectional flow function are obtained.

16) Since the rod-side cushioning device including a fixed type cushion ring is further provided, a shock at the stroke end upon extending the piston rod is also reduced, and further the number of parts of the rod-side cushioning device can be reduced, and in particular when the rod-side cushioning device is combined with the aforementioned paragraph (9), since the cushioning members both of the rod side and in the bottom side are united with the piston as one body, the number of parts can be minimized.

What is claimed is:

1. A hydraulic cylinder for hydraulic construction machines, comprising:
 a piston rod, a piston connected to an end of said piston rod, and a cylinder body having therein a rod-side chamber and a bottom-side chamber divided by said piston and alternately supplied with a hydraulic fluid to extend and retract said piston rod;
 wherein said piston is fixed directly to said piston rod by a plurality of bolts inserted through bolt through-holes formed in said piston and secured into a plurality of threaded holes provided in said piston rod to open at an end surface of said piston rod within a cross-section thereof while a rod-side end surface of said piston is disposed at least partially in face-to-face contact with said end surface of said piston rod; and
 wherein a bottom-side cushioning device protruding from a bottom-side end surface of said piston is provided so as to enter a cushion hole connected to a bottom-side hydraulic fluid port of said cylinder body when said piston rod is moved to contract.

2. A hydraulic cylinder according to claim 1, wherein said bottom-side cushioning device has a centering function to bring said bottom-side cushioning device into an axial alignment with said cushion hole when said bottom-side cushioning device enters said cushion hole.

3. A hydraulic cylinder according to claim 1, wherein said bottom-side cushioning device includes a cushion plunger protruding from a bottom-side end surface of said piston so as to be able to enter said cushion hole when said piston rod is moved to contract, and centering means associated with said cushion plunger for bringing said cushion plunger into an axial alignment with said cushion hole when said cushion plunger enters said cushion hole, and unidirectional flow means associated with said cushion plunger for preventing a hydraulic fluid from flowing from said bottom-side chamber into said hydraulic fluid port when said cushion plunger enters said cushion hole while allowing a hydraulic fluid to flow from said hydraulic fluid port into said bottom-side chamber when said cushion plunger is withdrawn from said cushion hole.

4. A hydraulic cylinder according to claim 1, wherein said bottom-side cushioning device includes a cushion plunger protruding from a bottom-side end surface of said piston so as to be able to enter said cushion hole when said piston rod is moved to contract.

5. A hydraulic cylinder according to claim 4, wherein said cushion plunger is of a fixed type in which said cushion plunger is united with said piston as one body.

6. A hydraulic cylinder according to claim 4, wherein said cushion plunger includes inclined grooves formed in an outer circumferential portion of said cushion plunger so as to be widened toward a front end of said plunger.

7. A hydraulic cylinder according to claim 1, wherein: said bottom-side cushioning device includes a shaft portion protruding from a bottom-side end surface of said piston, a floating type cushion ring loosely fitted on said shaft portion so as to be movable radially and axially, and a stopper plug provided at an end of said shaft portion, and said cushion ring providing a centering function to bring said cushion ring into an axial alignment with said cushion hole when said cushion ring enters said cushion hole and a unidirectional flow function to prevent a hydraulic fluid from flowing from said bottom-side chamber into said hydraulic fluid port when said cushion ring enters said cushion hole while allowing a hydraulic fluid to flow from said hydraulic fluid port into said bottom-side chamber when said cushion ring is withdrawn from said cushion hole.

8. A hydraulic cylinder comprising a piston rod, a piston connected to an end of said piston rod, and a cylinder body having therein a rod-side chamber and a bottom-side chamber divided by said piston, wherein said piston is fixed directly to said piston rod by a bolt inserted through a bolt through-hole formed in said piston and secured into a threaded hole provided in said piston rod while a rod-side end surface of said piston is disposed at least partially in face-to-face contact with an end surface of said piston rod,
 wherein a bottom-side cushioning device includes a cushion plunger protruding from a bottom-side end surface of said piston so as to be able to enter a cushion hole connected to a bottom-side hydraulic fluid port of said cylinder body when said piston rod is moved to contract, and wherein: said cushion plunger includes an enlarged base end portion located between the end surface of said piston rod and the rod-side end surface of said piston, and a shaft portion passing through said piston and protruding from the bottom-side end surface of said piston; said cushion plunger is retained with said enlarged base end portion while being allowed to radially move or tilt simultaneously when said piston is fixed to said piston rod by said bolt, said arrangement of the cushion plunger to allow the radial movement or tilting providing a centering function to bring said cushion plunger into an axial alignment align with said cushion hole when said cushion plunger enters said cushion hole.

9. A hydraulic cylinder according to claim 8, wherein: said enlarged base end portion of said cushion plunger is a flange portion provided at a base end of said cushion plunger; said piston is formed at its central portion with a through-hole through which said shaft portion of the cushion plunger passes and an counter-sunk hole receiving said flange portion, said flange portion being located in said counter-sunk hole between the end surface of said piston rod and a wall portion of said counter-sunk hole; said through-hole and counter-sunk hole are dimensioned in such a manner to provide gaps between said through-hole and said shaft portion of said cushion plunger and between said counter-sunk hole and said flange portion of said cushion plunger thereby to allow said cushion plunger to move radially.

10. A hydraulic cylinder according to claim 9, wherein resilient means is disposed between said flange portion at the base end of said cushion plunger and the end surface of said piston rod or the rod-side end surface of said piston thereby to resiliently restrict the axial movement of said cushion plunger.

11. A hydraulic cylinder according to claim 8, wherein: said enlarged base end portion of said cushion plunger is a spherical portion provided at a base end of said cushion plunger; said spherical portion is held between the end surface of said piston rod and the rod-side end surface of said piston so as to come into spherical contact therewith; said piston is formed at its central portion with a through-hole through which said shaft portion of said cushion plunger passes; said through-hole is dimensioned in such a manner to provide a gap between said through-hole and said shaft portion of said cushion plunger thereby to allow said cushion plunger to tilt.

12. A hydraulic cylinder according to claim 8, wherein: said cushion plunger includes a first passage formed to open at an end of said shaft portion and extend axially in said shaft portion, a second passage for enabling said first passage to communicate with said bottom-side chamber, and check valve means disposed between said first passage and said second passage whereby a unidirectional flow function is provided to prevent a hydraulic fluid from flowing from said bottom-side chamber into said hydraulic fluid port when said cushion plunger enters said cushion hole while allowing a hydraulic fluid to flow from said hydraulic fluid port into said bottom-side chamber when said cushion plunger is withdrawn from said cushion hole.

13. A hydraulic cylinder according to claim 12, herein: said second passage includes an inner diameter hole formed at an end surface of said cushion plunger at the side of said enlarged base end portion and in which said first passage, and a radial small holes for connecting said inner diameter hole to said bottom-side chamber; and said check valve means includes a ball disposed in said inner diameter hole to allow opening/closing of said first passage, and a spring disposed in said inner diameter hole to urge said ball in a direction of closing of said first passage.

14. A hydraulic cylinder according to claim 12, wherein: said enlarged base end portion of said cushion plunger is a flange portion provided at a base end of said cushion plunger; said piston includes a through-hole and a counter-sunk hole formed in its central portion of an end surface of said piston at the side of said piston rod, said shaft portion of said cushion plunger being inserted in said through-hole with a radial gap and said flange portion being received in said counter-sunk hole between the piston and the end surface of said piston rod with radial and axial gaps; said second passage includes an inner diameter recess formed in an end surface of said cushion plunger at the side of said piston rod with an outer circumferential end surface portion being left and in which said first passage opens, and a connection passage through which the radial gap between said flange portion and a wall portion of said counter-sunk hole communicates with said bottom-side chamber; said check valve means includes a radial stepped surface of said flange portion at the side of said shaft portion, said outer circumferential end surface portion of said piston rod-side end surface of said cushion plunger, and a portion of said piston-side end surface of said piston rod in contact with said outer circumferential end surface portion; and said inner diameter recess is dimensioned such that an axial hydraulic pressure acting on said outer circumferential end surface portion is lower than an axial hydraulic pressure acting on said radial stepped surface when said cushion plunger enters said cushion hole.

15. A hydraulic cylinder for hydraulic construction machines, comprising:

a piston rod, a piston connected to an end of said piston rod, a cylinder body having therein a rod-side chamber and a bottom-side chamber divided by said piston and alternately supplied with a hydraulic fluid to extend and retract said piston rod, and a rod-side cushioning device including a floating type cushion ring loosely fitted on a portion of said piston rod adjacent to said piston so as to be movable radially and axially, said cushion ring entering a cushion hole connected to a rod-side hydraulic fluid port of said cylinder body thereby to reduce a shock at a stroke end when said piston rod is moved to extend;

wherein said piston is fixed directly to said piston rod by a plurality of bolts inserted through bolt through-holes formed in said piston and secured into a plurality of threaded holes provided in said piston rod to open at an end surface of said piston rod within a cross-section thereof while a rod-side end surface of said piston is disposed at least partially in face-to-face contact with said end surface of said piston rod.

16. A hydraulic cylinder for hydraulic construction machines, comprising:

a piston rod, a piston connected to an end of said piston rod, a cylinder body having therein a rod-side chamber and a bottom-side chamber divided by said piston and alternately supplied with a hydraulic fluid to extend and retract said piston rod, and a rod-side cushioning device including a cushion ring of a fixed type united with said piston as one body, said cushion ring entering a cushion hole connected to a rod-side hydraulic fluid port of said cylinder body thereby to reduce a shock at a stroke end when said piston rod is moved to extend;

wherein said piston is fixed directly to said piston rod by a plurality of bolts inserted through bolt through-holes formed in said piston and secured into a plurality of threaded holes provided in said piston rod to open at an end surface of said piston rod within a cross-section thereof while a rod-side end surface of said piston is disposed at least partially in face-to-face contact with said end surface of said piston rod.

17. A hydraulic cylinder for hydraulic construction machines comprising a piston rod, a piston connected to an end of said piston rod, and a cylinder body having therein a rod-side chamber and a bottom-side chamber divided by said piston and alternately supplied with a hydraulic fluid to extend and retract said piston rod, wherein said piston is fixed directly to said piston rod by a plurality of bolts inserted through bolt through-holes formed in said piston and secured into a plurality of threaded holes provided in said piston rod to open at an end surface of said piston rod within a cross-section thereof while a rod-side end surface of said piston is disposed at least partially in face-to-face contact with said end surface of said piston rod, wherein a bottom-side cushioning device is provided which comprises a cushion plunger protruding from a bottom-side end surface of said piston, a cushion hole which said cushion plunger is able to enter when said piston rod is moved to contract, and unidirectional flow means associated with said cushion plunger for preventing a hydraulic fluid from flowing from said bottom-side chamber into said hydraulic fluid port when said cushion plunger enters said cushion hole while allowing a hydraulic fluid to flow from said hydraulic fluid port into said bottom-side chamber when said cushion plunger is withdrawn from said cushion hole, and wherein said unidirectional flow means includes a first passage formed to open at an end of said cushion plunger and extend axially therein, a second passage for enabling said first passage to communicate with said bottom-side chamber, and check valve means disposed between said first passage and said second passage arranged between said first passage and second passage.

* * * * *